US012321923B2

(12) United States Patent
Rule et al.

(10) Patent No.: US 12,321,923 B2
(45) Date of Patent: *Jun. 3, 2025

(54) DETERMINING SPECIFIC TERMS FOR CONTACTLESS CARD ACTIVATION

(71) Applicant: Capital One Services, LLC, McLean, VA (US)

(72) Inventors: Jeffrey Rule, Chevy Chase, MD (US); Marisa Thomas, Richmond, VA (US); Amy Apponyi, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/125,281

(22) Filed: Mar. 23, 2023

(65) Prior Publication Data

US 2023/0237466 A1 Jul. 27, 2023

Related U.S. Application Data

(63) Continuation of application No. 17/527,513, filed on Nov. 16, 2021, now Pat. No. 11,645,646, which is a
(Continued)

(51) Int. Cl.
*G06K 5/00* (2006.01)
*G06Q 20/34* (2012.01)
*G06Q 20/38* (2012.01)

(52) U.S. Cl.
CPC ......... *G06Q 20/354* (2013.01); *G06Q 20/352* (2013.01); *G06Q 20/3829* (2013.01)

(58) Field of Classification Search
CPC .. G06Q 20/341; G06Q 20/3674; G06Q 20/40; G07F 7/1008; G07F 7/0886; G06K 19/07; G06K 7/10237
(Continued)

(56) References Cited

U.S. PATENT DOCUMENTS 8,162,208 B2 * 4/2012 Eckert ................. G06Q 20/386
705/17
10,129,648 B1 * 11/2018 Hernandez Santisteban ...............
H04R 5/027
(Continued)

FOREIGN PATENT DOCUMENTS

JP 2002123764 A 4/2002
JP 2010277527 A 12/2010
(Continued)

*Primary Examiner* — Daniel St Cyr
(74) *Attorney, Agent, or Firm* — KDW FIRM PLLC

(57) ABSTRACT

Systems, methods, articles of manufacture, and computer-readable media for determining specific terms to activate a contactless card. An application executing on a server may receive a request from a device specifying a uniform resource locator comprising encrypted data, the encrypted data based at least in part on a private key assigned to a contactless card. The application may decrypt the encrypted data and determine a type of the contactless card. The application may determine a plurality of terms associated with the type of the contactless card and transmit the terms to a web browser on the device. The application may receive, from the web browser, an indication specifying acceptance of the plurality of terms. The application may store, based on the decryption of the encrypted data and the received indication specifying acceptance of the terms, an indication in a database specifying the contactless card is activated for use.

17 Claims, 17 Drawing Sheets

Related U.S. Application Data continuation of application No. 16/847,268, filed on Apr. 13, 2020, now Pat. No. 11,210,656.

(58) Field of Classification Search
USPC .............................. 235/380, 382, 487, 492
See application file for complete search history.

(56) References Cited

U.S. PATENT DOCUMENTS

| | | | | |
|---|---|---|---|---|
| 10,133,979 | B1 * | 11/2018 | Eidam | G06K 19/07762 |
| 10,467,622 | B1 * | 11/2019 | Rule | H04W 4/80 |
| 11,210,656 | B2 * | 12/2021 | Rule | G06Q 20/3263 |
| 11,645,646 | B2 * | 5/2023 | Rule | G06Q 20/3263 |
| | | | | 235/380 |
| 2004/0124246 | A1 * | 7/2004 | Allen | G06Q 20/108 |
| | | | | 235/492 |
| 2011/0053560 | A1 * | 3/2011 | Jain | H04W 12/068 |
| | | | | 455/411 |
| 2020/0090168 | A1 * | 3/2020 | Mossler | G06Q 20/354 |
| 2020/0106614 | A1 * | 4/2020 | Rule | G06F 21/44 |
| 2021/0004786 | A1 * | 1/2021 | Mossler | H04L 9/3073 |

FOREIGN PATENT DOCUMENTS

| | | |
|---|---|---|
| JP | 2015153274 A | 8/2015 |
| WO | 2020072529 A1 | 4/2020 |

* cited by examiner

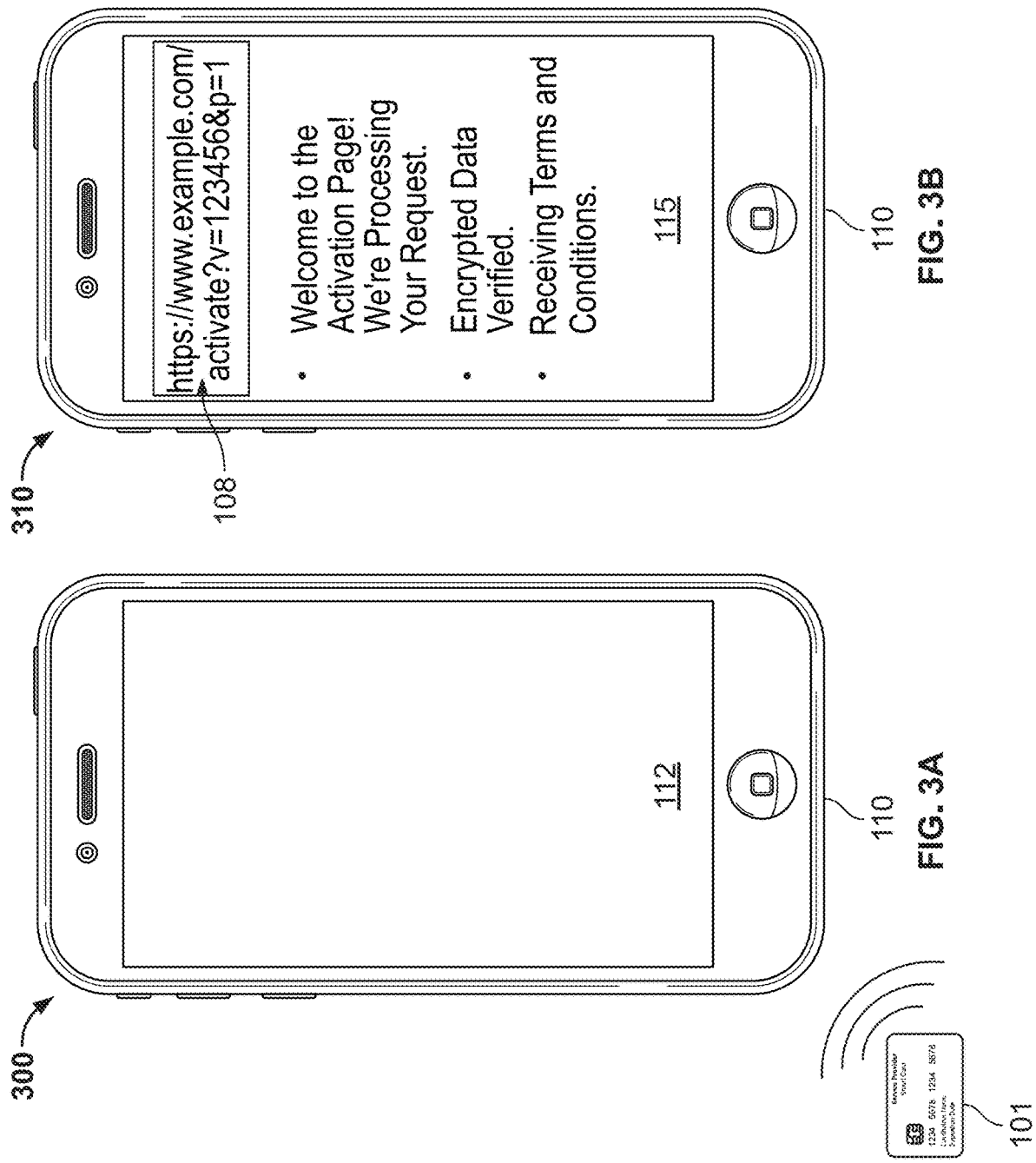

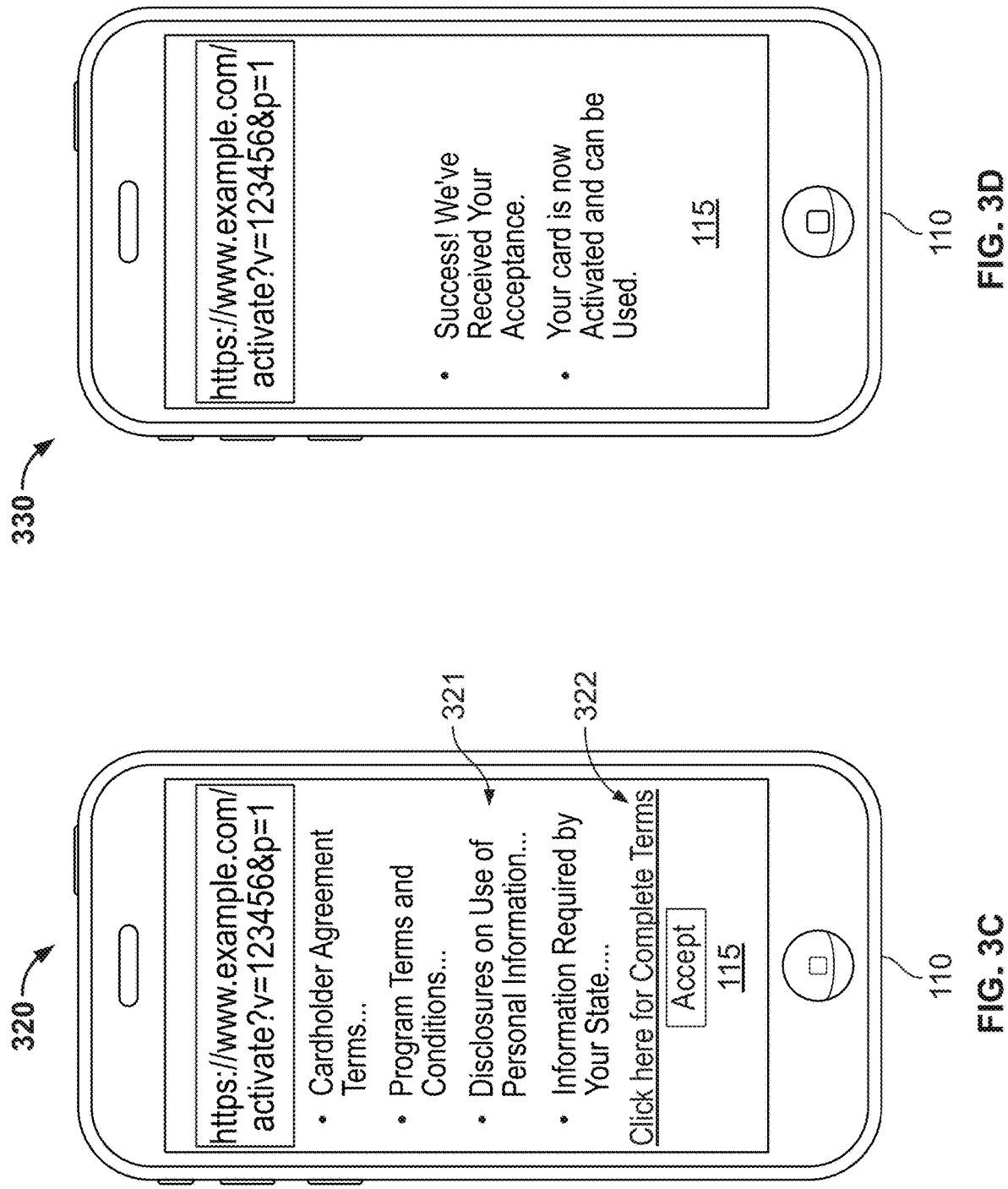

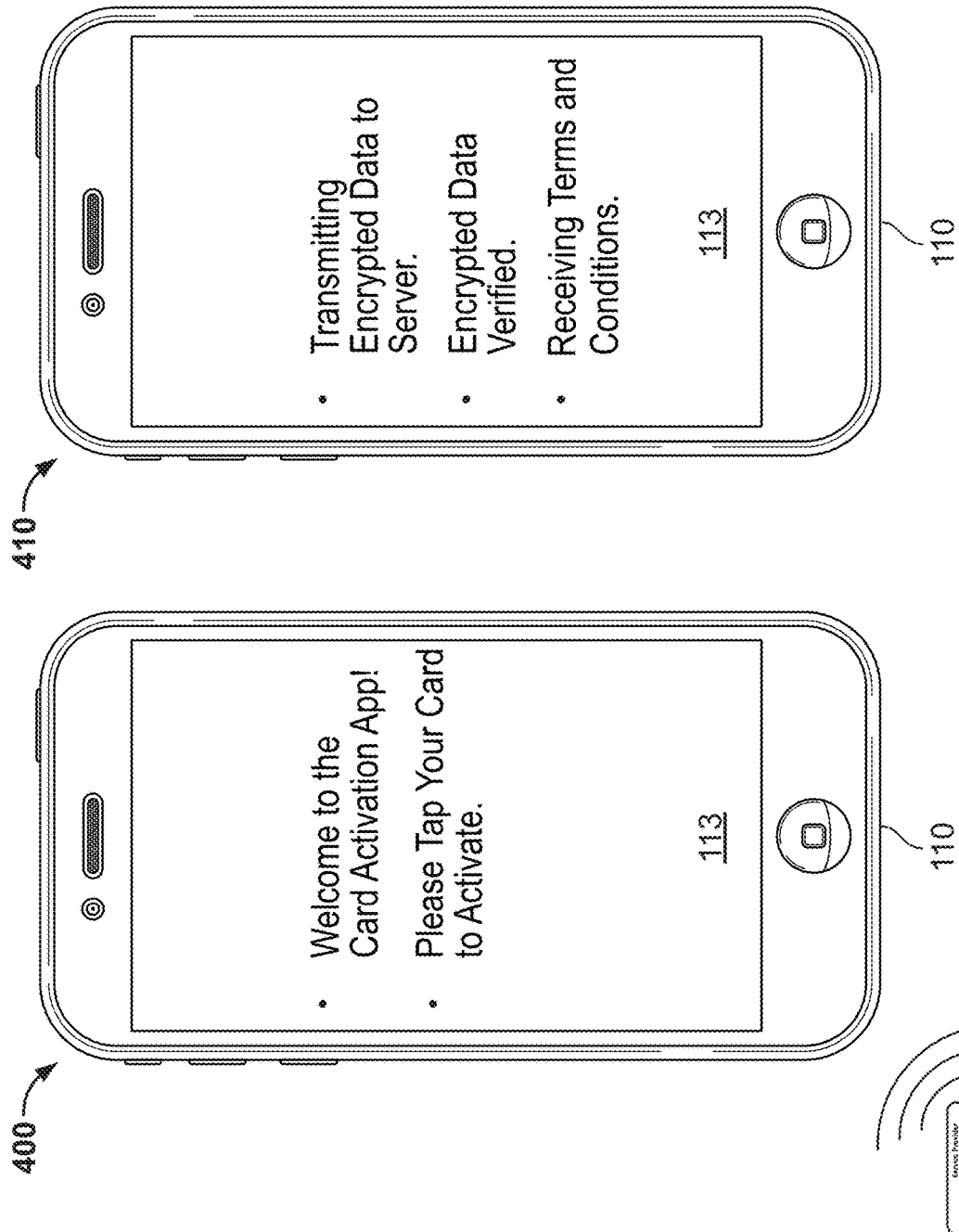

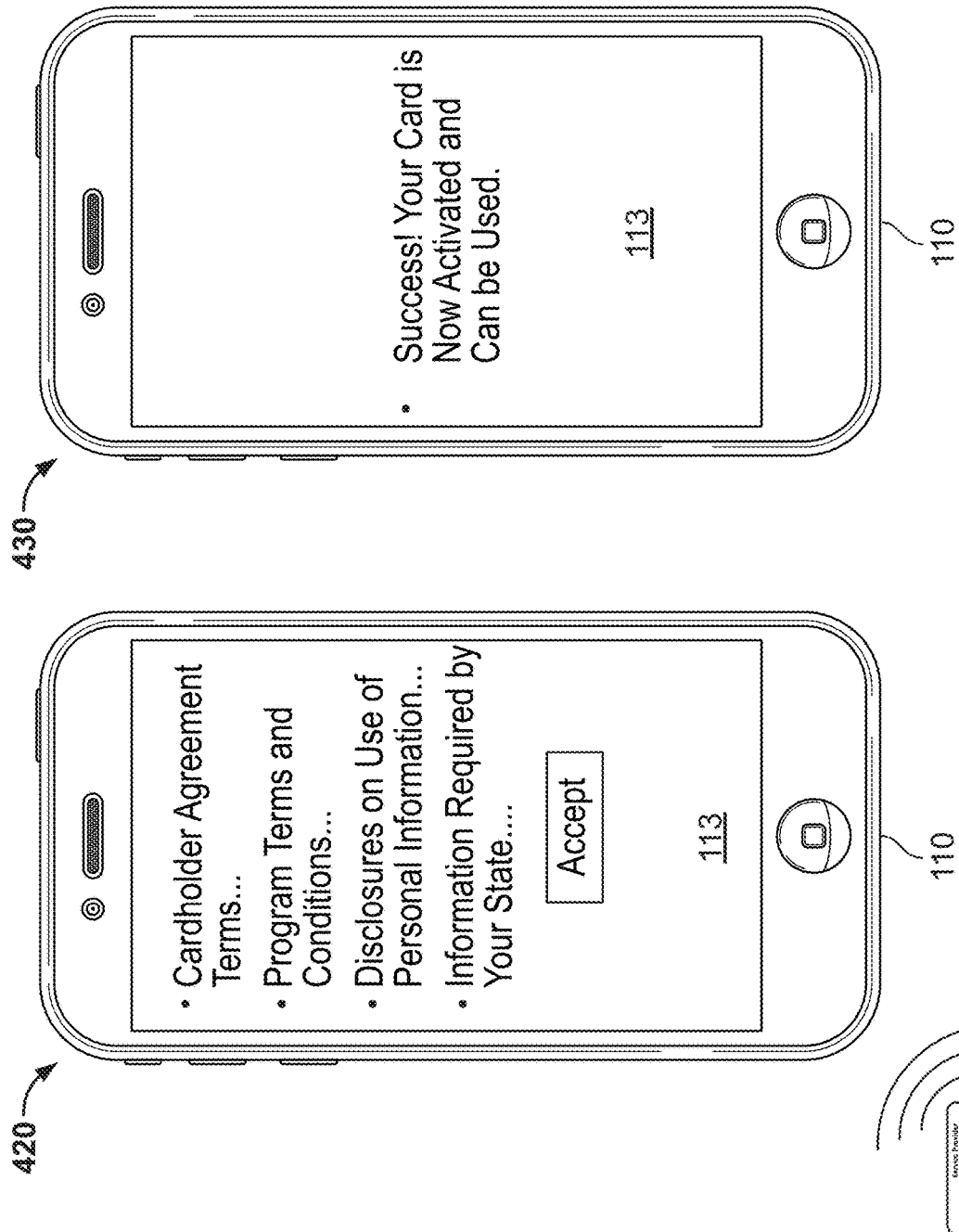

DETERMINING SPECIFIC TERMS FOR CONTACTLESS CARD ACTIVATION

RELATED APPLICATIONS

This application is a continuation of U.S. patent application Ser. No. 17/527,513, filed Nov. 16, 2021, which is a continuation of U.S. patent application Ser. No. 16/847,268, titled "DETERMINING SPECIFIC TERMS FOR CONTACTLESS CARD ACTIVATION" filed on Apr. 13, 2020. The contents of the aforementioned application are incorporated herein by reference in their entirety.

TECHNICAL FIELD

Embodiments herein generally relate to computing platforms, and more specifically, to computing platforms to determine specific terms for contactless card activation.

BACKGROUND

Payment cards may be mailed to a customer in an inactive state such that the cards cannot be used for purchases or other transactions prior to activation. There are significant security risks involved in the card activation process. Furthermore, different requirements may be imposed on the activation of specific types of cards. While some solutions have attempted to move the activation process to online platforms, these solutions do not offer the flexibility and security required to scale to the ever increasing number of card types.

SUMMARY

Embodiments disclosed herein provide systems, methods, articles of manufacture, and computer-readable media for determining specific terms to activate a contactless card. In one example, an application executing on a server may receive a request from a device specifying a uniform resource locator comprising encrypted data, the encrypted data based at least in part on a private key assigned to a contactless card. The application may decrypt the encrypted data and determine a type of the contactless card. The application may determine a plurality of terms associated with the type of the contactless card and transmit the terms to a web browser on the device. The application may receive, from the web browser, an indication specifying acceptance of the plurality of terms. The application may store, based on the decryption of the encrypted data and the received indication specifying acceptance of the terms, an indication in a database specifying the contactless card is activated for use.

BRIEF DESCRIPTION OF THE DRAWINGS

FIGS. 3A-3D illustrate embodiments of determining specific terms for contactless card activation.
FIGS. 4A-4D illustrate embodiments of determining specific terms for contactless card activation.

DETAILED DESCRIPTION

Figure 1A:
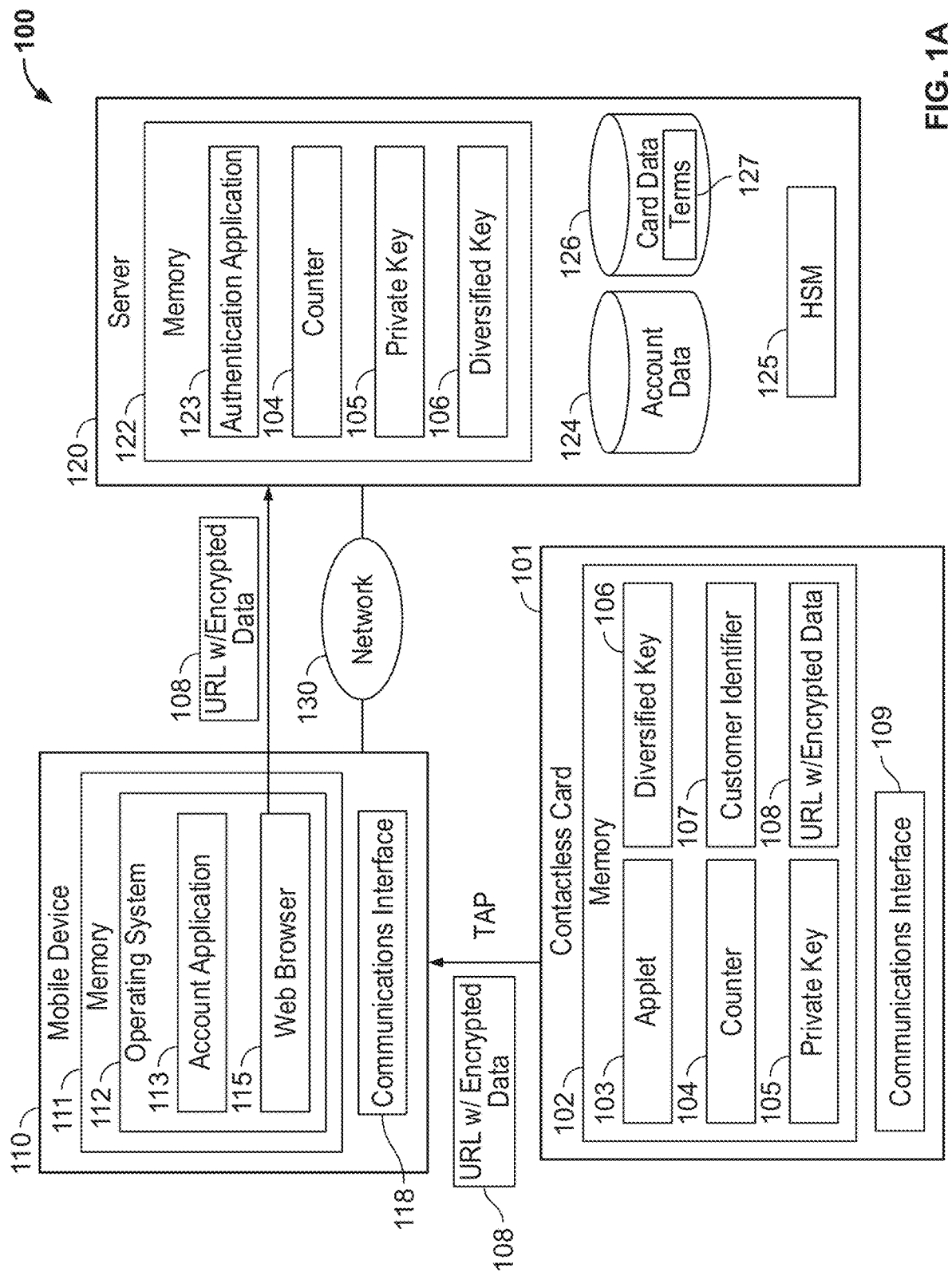
FIGS. 1A-1C illustrate embodiments of a system for determining specific terms for contactless card activation.

Embodiments disclosed herein provide techniques for secure activation of contactless cards with disclosure of card-specific terms and/or customer-specific terms. Generally, a user may receive a contactless card in an inactive state that must be activated to be used. In some embodiments, the user may tap the contactless card to a computing device, such as a smartphone, to initiate the activation process. Tapping the contactless card to the smartphone (or otherwise brining the contactless card within wireless data communications range of the smartphone) may cause the contactless card to generate encrypted data. The encrypted data may be transmitted to the smartphone.

In some embodiments, the encrypted data generated by the contactless card may be part of a uniform resource locator (URL) directed to a server. Once received, an operating system (OS) of the smartphone may cause a web browser to access the URL. When accessed, the server may receive the encrypted data, and decrypt the encrypted data to verify the authenticity of the contactless card. The server may then determine a type of the contactless card and determine a plurality of terms and conditions associated with the card. The terms and conditions may be transmitted to the web browser on the smartphone, where the user may then accept and/or decline the terms and conditions. If the user accepts, an indication of the acceptance is transmitted to the server, which may activate the contactless card, e.g., by storing an indication that the contactless card is active in a database. The user may then use the contactless card for any desired payment transaction.

Advantageously, embodiments disclosed herein improve the security of all devices and associated data. For example, by requiring validation of encrypted data generated by the contactless card to activate the contactless card, the security of the contactless card is improved. As another example, by presenting terms and conditions specific to a type of the contactless card and/or other user attributes, user privacy and compliance with applicable laws and regulations is improved. Furthermore, doing so removes the need of the card issuer to mail the terms and condition in paper format, thereby conserving resources.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more mobile computing devices 110, and an authentication server 120. The contactless cards 101 are representative of any type of payment cards, such as a credit card, debit card, ATM card, gift card, and the like. The contactless cards 101 may comprise one or more communications interfaces 109, such as a radio frequency identification (RFID) chip, configured to communicate with the computing devices 110 via NFC, the EMV standard, or other short-range protocols in wireless communication. Although NFC is used as an example communications protocol, the disclosure is equally applicable to other types of communications, such as the EMV standard, Bluetooth, and/or Wi-Fi. The mobile devices 110 are representative of any type of network-enabled computing devices, such as smartphones, tablet computers, wearable devices, laptops, portable gaming devices, and the like. The authentication server 120 is representative of any type of computing device, such as a server, workstation, compute cluster, cloud computing platform, virtualized computing system, and the like.

As shown, a memory 102 of the contactless card includes an applet 103, a counter 104, a private key 105, a diversified key 106, and a unique customer identifier (ID) 107. The applet 103 is executable code configured to perform the operations described herein. The counter 104, private key 105, diversified key 106, and customer ID 107 are used to provide security in the system 100 as described in greater detail below.

As shown, a memory 111 of the mobile device 110 includes an instance of an operating system (OS) 112. Example operating systems 112 include the Android® OS, iOS®, macOS®, Linux®, and Windows® operating systems. As shown, the OS 112 includes an account application 113. The account application 113 allows users to perform various account-related operations, such as activating one or more contactless cards 101, viewing account balances, purchasing items, processing payments, and the like. The account application 113 may further control access permissions to different functions provided by the account application 113. In some embodiments, a user may authenticate using authentication credentials to access certain features of the account application 113. For example, the authentication credentials may include a username (or login) and password, biometric credentials (e.g., fingerprints, Face ID, etc.), and the like.

As stated, the contactless cards 101 may need to be activated before the contactless cards 101 may be used to provide payment data for transactions. To activate a contactless card 101, the user may tap the contactless card 101 to the device 110. Generally, once the contactless card 101 is brought within communications range of the communications interface 118 of the device 110, the applet 103 of the contactless card 101 may generate encrypted data as part of the authentication process required to activate the contactless card 101. For example, in some embodiments, the applet 103 may generate a URL with encrypted data 108 as part of the authentication process required to activate the contactless card 101. To enable NFC data transfer between the contactless card 101 and the mobile device 110, the account application 113 may communicate with the contactless card 101 when the contactless card 101 is sufficiently close to the communications interface 118 of the mobile device 110. The communications interface 118 may be configured to read from and/or communicate with the communications interface 109 of the contactless card 101 (e.g., via NFC, Bluetooth, RFID, etc.). Therefore, example communications interfaces 118 include NFC communication modules, Bluetooth communication modules, and/or RFID communication modules.

As stated, the system 100 is configured to implement key diversification to secure data, which may be referred to as a key diversification technique herein. Generally, the server 120 (or another computing device) and the contactless card 101 may be provisioned with the same private key 105 (also referred to as a master key, or master symmetric key). More specifically, each contactless card 101 is programmed with a unique private key 105 that has a corresponding pair in (or managed by) the server 120. For example, when a contactless card 101 is manufactured, a unique private key 105 may be stored in the memory 102 of the contactless card 101. Similarly, the unique private key 105 may be stored in a record (or profile) of a customer associated with the contactless card 101 in the account data 124 of the server 120 (and/or stored in a different secure location, such as the hardware security module (HSM) 125). The private key 105 may be kept secret from all parties other than the contactless card 101 and server 120, thereby enhancing security of the system 100. In some embodiments, the applet 103 of the contactless card 101 may encrypt and/or decrypt data (e.g., the customer ID 107) using the private key 105 and the data as input a cryptographic algorithm. For example, encrypting the customer ID 107 with the private key 105 may result in an encrypted customer ID. Similarly, the authentication server 120 may encrypt and/or decrypt data associated with the contactless card 101 using the corresponding private key 105.

In some embodiments, the counters 104 and/or private keys 105 of the contactless card 101 and server 120 may be used in conjunction with the counters 104 to enhance security using key diversification. The counters 104 comprise values that are synchronized between a given contactless card 101 and server 120. The counter value 104 may comprise a number that changes each time data is exchanged between the contactless card 101 and the server 120 (and/or the contactless card 101 and the mobile device 110). When preparing to send data (e.g., to the server 120 and/or the mobile device 110), the applet 103 of the contactless card 101 may increment the counter value 104. The contactless card 101 may then provide the private key 105 and counter value 104 as input to a cryptographic algorithm, which produces a diversified key 106 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety. The applet 103 of the contactless card 101 may include the cryptographic payload as a parameter of the URL with encrypted data 108.

Continuing with the key diversification example, the contactless card 101 may then encrypt the data (e.g., the customer ID 107 and/or any other data) using the diversified key 106 and the data as input to the cryptographic algorithm. For example, encrypting the customer ID 107 with the diversified key 106 may result in an encrypted customer ID. In some embodiments, the encrypted data generated by the contactless card 101 may include a URL. The URL may be directed to the authentication server 120, or some other URL associated with an entity issuing the contactless card 101. In other embodiments, the URL may further be a universal link URL that opens a local resource (e.g., a specific page of the account application 113, such as a card activation page). The URL may further include data (e.g., parameters) used by the authentication server 120 to validate the data generated by the contactless card 101.

For example, if the URL to the authentication server 120 (and/or the URL to the account application 113) is "http://www.example.com/accountapp" and the encrypted data generated based on the aforementioned encryption operations is "ABC123", the URL with encrypted data 108 may be "http://www.example.com/accountapp?data=ABC123". In some embodiments, the applet 103 may encode the encrypted data according to an encoding format compatible with URLs prior to including the encrypted data as a parameter of the URL 108. For example, the encrypted data may be a string of binary data (e.g., zeroes and ones), which may not be compatible with URLs. Therefore, the applet 103 may encode the encrypted data to the American Standard Code for Information Interchange (ASCII) base64 encoding format. Doing so represents the binary encrypted data in an ASCII string format by translating it into a radix-64 representation (e.g., "ABC123" in the previous example). Further still, in embodiments where the URL is directed to a local resource, such as the account application 113, the URL 108 may include an indication of which page of the account application 113 to open. Continuing with the previous example, a page identifier of "1" (or other page identifier, such as a page name, etc.) may be added as a parameter to the URL, and the URL with encrypted data 108 may be "http://www.example.com/accountapp?data=ABC123&p=1".

Once generated, the applet 103 may transmit the URL with encrypted data 108 to the mobile device 110, e.g., via NFC. In one embodiment, when received by the OS 112, the OS 112 causes the web browser 115 to access the URL with encrypted data 108. Doing so causes information describing the mobile device 110 to be sent with the request to access the URL with encrypted data 108. For example, the information may include attributes of the mobile device 110, such as operating system version, hardware capabilities, and software capabilities.

In the embodiment depicted in FIG. 1A, the URL with encrypted data 108 is directed to the server 120, which may include a hypertext transfer protocol (HTTP) server. In one embodiment, the authentication application 123 provides the HTTP server and/or associated functionality. Therefore, the web browser 115 accessing the URL with encrypted data 108 causes the server 120 to receive the URL with encrypted data 108, e.g., in an HTTP request. The authentication application 123 may receive the URL with encrypted data 108 and extract the encrypted data, which may include the encrypted customer ID (e.g., the "ABC123" from the previous example, etc.). The authentication application 123 may convert the encrypted data to the original encoding format (e.g., from ASCII base64 to binary). The account application 113 may similarly perform conversions, e.g., from ASCII base 64 to binary, and vice versa.

The authentication application 123 may then attempt to authenticate the encrypted data. For example, the authentication application 123 may attempt to decrypt the encrypted data using a copy of the private key 105 stored by the server 120. In another example, the authentication application 123 may provide the private key 105 and counter value 104 as input to the cryptographic algorithm, which produces a diversified key 106 as output. The resulting diversified key 106 may correspond to the diversified key 106 of the contactless card 101, which may be used to decrypt the encrypted customer ID 107. Therefore, the authentication application 123 may successfully decrypt the encrypted data, thereby verifying the encrypted data. For example, as stated, a customer ID 107 may be used to generate the encrypted data included in the URL with encrypted data 108. In such an example, the authentication application 123 may decrypt the encrypted data using the private key 105 of the authentication server 120. If the result of the decryption yields the customer ID 107 associated with the account in the account data 124, the authentication application 123 verifies the encrypted data. If the authentication application 123 is unable to decrypt the encrypted data to yield the expected result (e.g., the customer ID 107 of the account associated with the contactless card 101), the authentication application 123 does not verify (or validate or authenticate) the encrypted data. Due to the failed verification, the authentication application 123 may return an error to the web browser 115 and/or otherwise reject the attempted activation of the contactless card 101.

Regardless of the decryption technique used, the authentication application 123 may successfully decrypt the encrypted customer ID 107, thereby verifying the encrypted customer ID 107 (e.g., by comparing the resulting customer ID 107 to a customer ID stored in the account data 124, and/or based on an indication that the decryption using the key 105 and/or 106 was successful). Although the keys 105, 106 are depicted as being stored in the memory 122, the keys 105, 106 may be stored elsewhere, such as in a secure element and/or the HSM 125. In such embodiments, the secure element and/or the HSM 125 may decrypt the encrypted customer ID 107 using the keys 105 and/or 106 and a cryptographic function. Similarly, the secure element and/or HSM 125 may generate the diversified key 106 based on the private key 105 and counter value 104 as described above.

If the authentication application 123 verifies the encrypted customer ID 107 in the URL with encrypted data 108, the authentication application 123 may return a corresponding indication of verification to the web browser 115. The authentication application 123 may then determine a type of the contactless card 101 being activated, e.g., based on a type specified in the account data 124 and/or the card data 126. For example, each card may be associated with a unique identifier that is associated with at least one type of card, of a plurality of card types. The authentication application 123 may further receive data describing attributes of the customer associated with the contactless card 101 being activated, e.g., the customer's address, date of birth, etc. Using the card type and/or the customer attributes, the authentication application 123 may determine a plurality of terms 127 from the card data 126 applicable to the card type and/or the customer data. The terms 127 may generally include terms, conditions, card member agreements, disclosures regarding the use of personal information, legal disclosures, privacy notices, and the like, which may collectively be referred to as "terms" herein. For example, a first card type may have a first plurality of terms (e.g., interest rates, disclosures, etc.), while a second card type may have a second plurality of terms, which may be the same and/or different than the first plurality of terms. Similarly, a customer located in a first state (e.g., based on the customer's address) may be required to receive additional and/or different terms relative to a customer located in a second state. Therefore, based on the customer attributes and/or the card type, the authentication application 123 dynamically determines a specific set of terms required to activate the contactless card 101.

In some embodiments, the authentication application 123 may determine that the contactless card 101 is a replacement for a previously active contactless card. In such embodiments, the user may have previously accepted the custom terms for the previous card, and a reduced set of terms 128 may be determined to activate the contactless card. For example, each contactless card 101 may be associated with an issue and/or manufacture date. The authentication application 123 may determine the dates of the replacement card 101 and the previous card and determine the terms 127 based on the dates. In one embodiment, the authentication application 123 computes a difference of the different terms to determine the reduced set of terms (also referred to as a subset of terms). The authentication application 123 may therefore determine the reduced set of terms that have changed, been added, and/or been removed based on the dates of each card. Doing so allows the authentication application 123 to transmit the reduced set of terms as the custom terms 128 to the web browser 115. However, the full set of terms may be included with the reduced set of terms. The user may then accept the reduced set of terms as part of the activation process of the replacement card 101. In some embodiments, the authentication application 123 may modify the format of the custom terms 128 to reflect which terms have changed for the replacement card. For example, if a new disclosure is added to the custom terms 128 of the replacement card that were not present in the terms 127 of the original card, the authentication application 123 may highlight, bold, italicize, enlarge the font, or otherwise modify the new disclosure such that the user can easily detect the new terms.

Figure 1B:
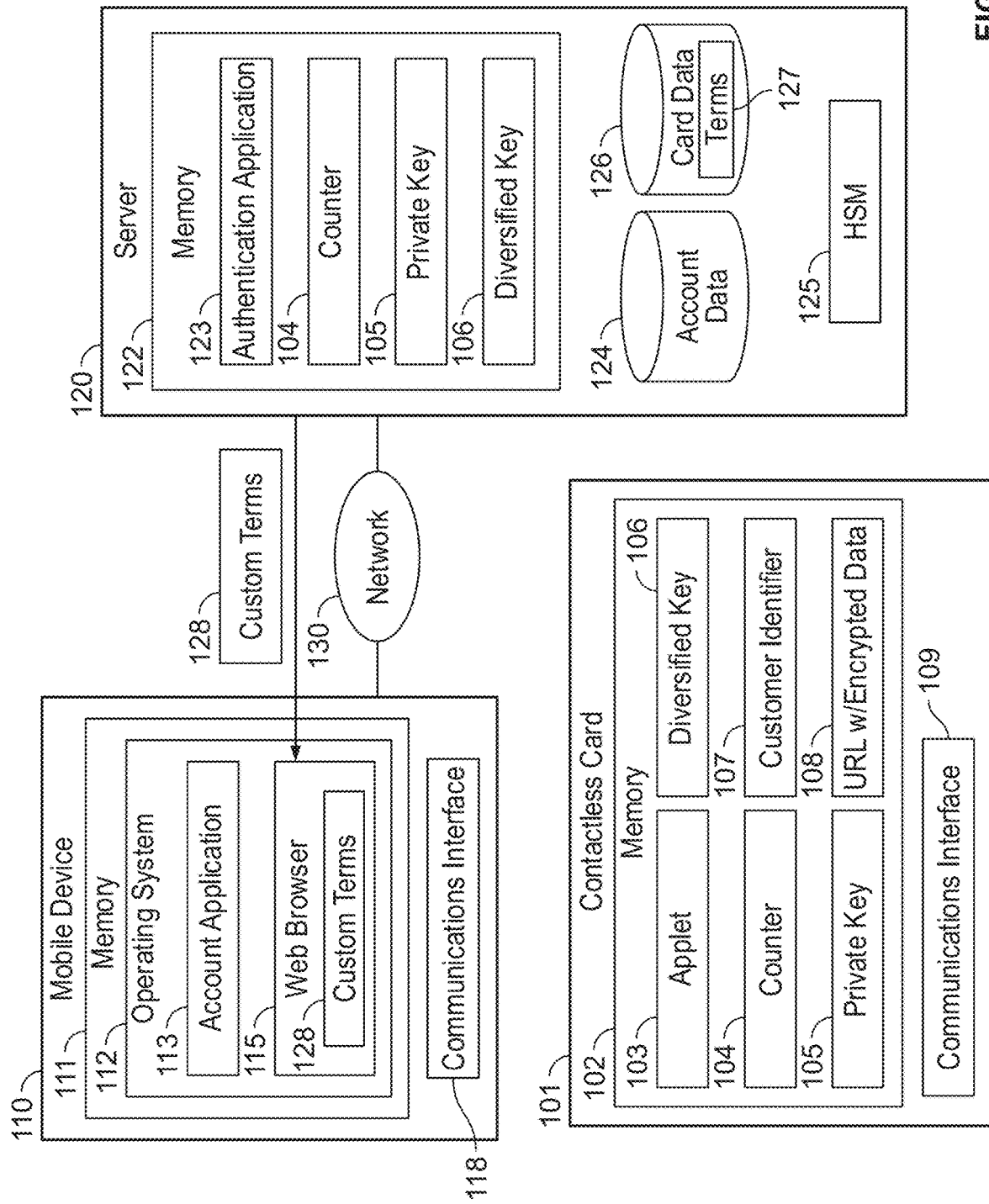

FIG. 1B illustrates an embodiment where the authentication application 123 has decrypted the encrypted customer ID, thereby verifying (or authenticating) the encrypted data in the URL with encrypted data 108, and determined a set of custom terms 128 applicable to the activation of the contactless card 101. As shown, the authentication application 123 transmits the custom terms 128 to the web browser 115, where the custom terms 128 may further indicate that the authentication application 123 successfully decrypted the encrypted customer ID.

Responsive to receiving the custom terms 128, the web browser 115 may output an interface displaying the custom terms 128 for activation of the contactless card 101. The user may then read the custom terms 128 and determine to accept the custom terms 128 to activate the contactless card 101. For example, the user may click a checkbox indicating acceptance of the custom terms 128, provide a signature, etc.

Figure 1C:
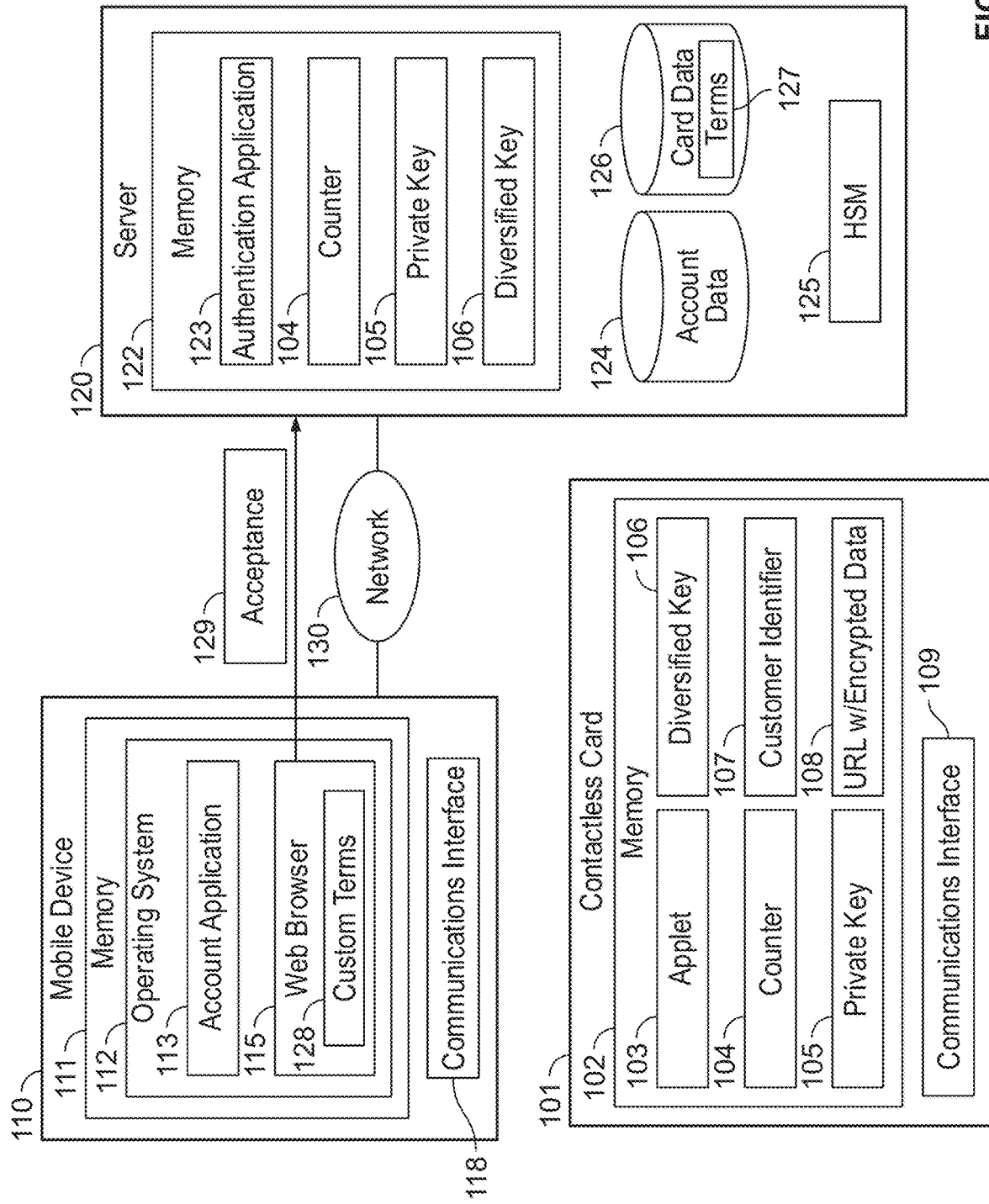

FIG. 1C depicts an embodiment where the user has accepted the custom terms 128 via the web browser 115. As shown, the web browser 115 then transmits an indication of acceptance 129 to the server 120. The authentication application 123 may then receive the acceptance 129, and determine to activate the contactless card 101 based on the successful decryption of the encrypted data included in the URL with encrypted data 108 and the user's acceptance of the custom terms 128. In one embodiment, the authentication application 123 may store an indication in a user profile in the account data 124 and/or the card data 126 indicating the contactless card 101 has been activated. Doing so allows the customer to use the contactless card 101 to provide payment data for transactions and/or provide the card number, expiration date, and/or CVV of the contactless card 101 in virtual interfaces to provide the payment data for transactions.

Figure 2A:
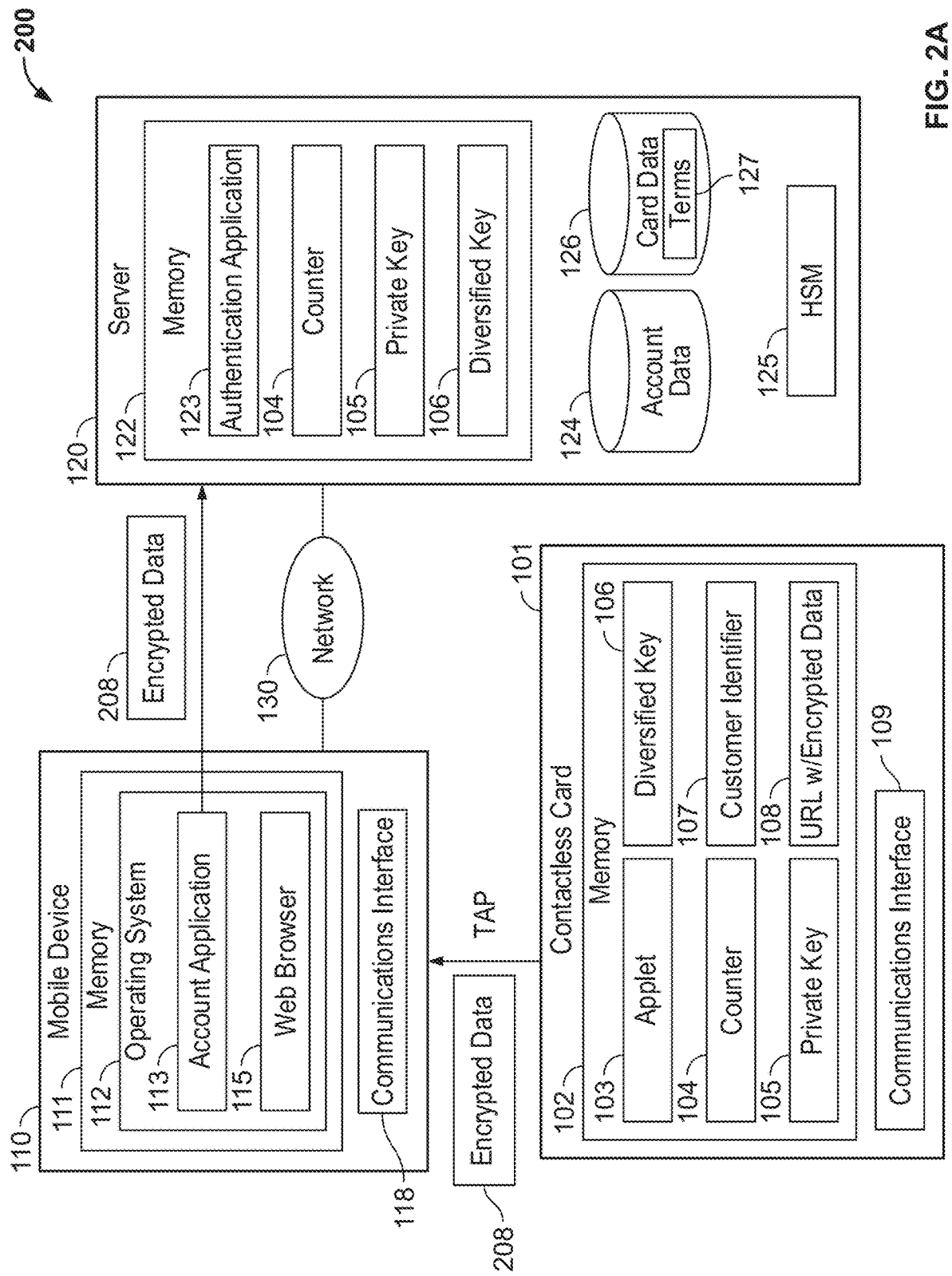
FIGS. 2A-2C illustrate embodiments of a system for determining specific terms for contactless card activation.

FIG. 2A is a schematic 200 depicting an embodiment where the account application 113 is used to activate the contactless card 101. As shown, the user taps the contactless card 101 to the mobile device 110 to proceed with the card activation. In some embodiments, the user may provide authentication credentials to access the account associated with the contactless card 101 prior to tapping the contactless card 101 to the device 110. However, in other embodiments, the user need not be logged in to their account to activate the contactless card 101.

In response to the tap of the contactless card 101, the applet 103 encrypts the customer ID 107, which is transmitted to the account application 113 as at least a portion of encrypted data 208. Generally, the encrypted customer ID included in the encrypted data 208 is generated by the applet 103 as described above with respect to the generation of the URL with encrypted data 108 (e.g., by encrypting the customer ID 107 with the private key 105 and/or the diversified key 106, where the diversified key 106 is generated based on the private key 105 and the counter value 104).

Responsive to receiving the encrypted customer ID in the encrypted data 208, the account application 113 may transmit the encrypted data 208 to the authentication server 120. Once received, the authentication application 123 may attempt to decrypt the encrypted customer ID 208 using the private key 105 and/or the diversified key 106 as described above. If the attempted decryption yields the customer ID 107 associated with the account, the authentication application 123 may transmit an indication of successful validation to the account application 113. Otherwise, if the attempted decryption of the encrypted customer ID 208 is not successful, the authentication application 123 may transmit an indication of the failed decryption to the account application 113, which may reject activation of the contactless card 101. As another example, the authentication application 123 may reject activation of the contactless card 101.

Figure 2B:
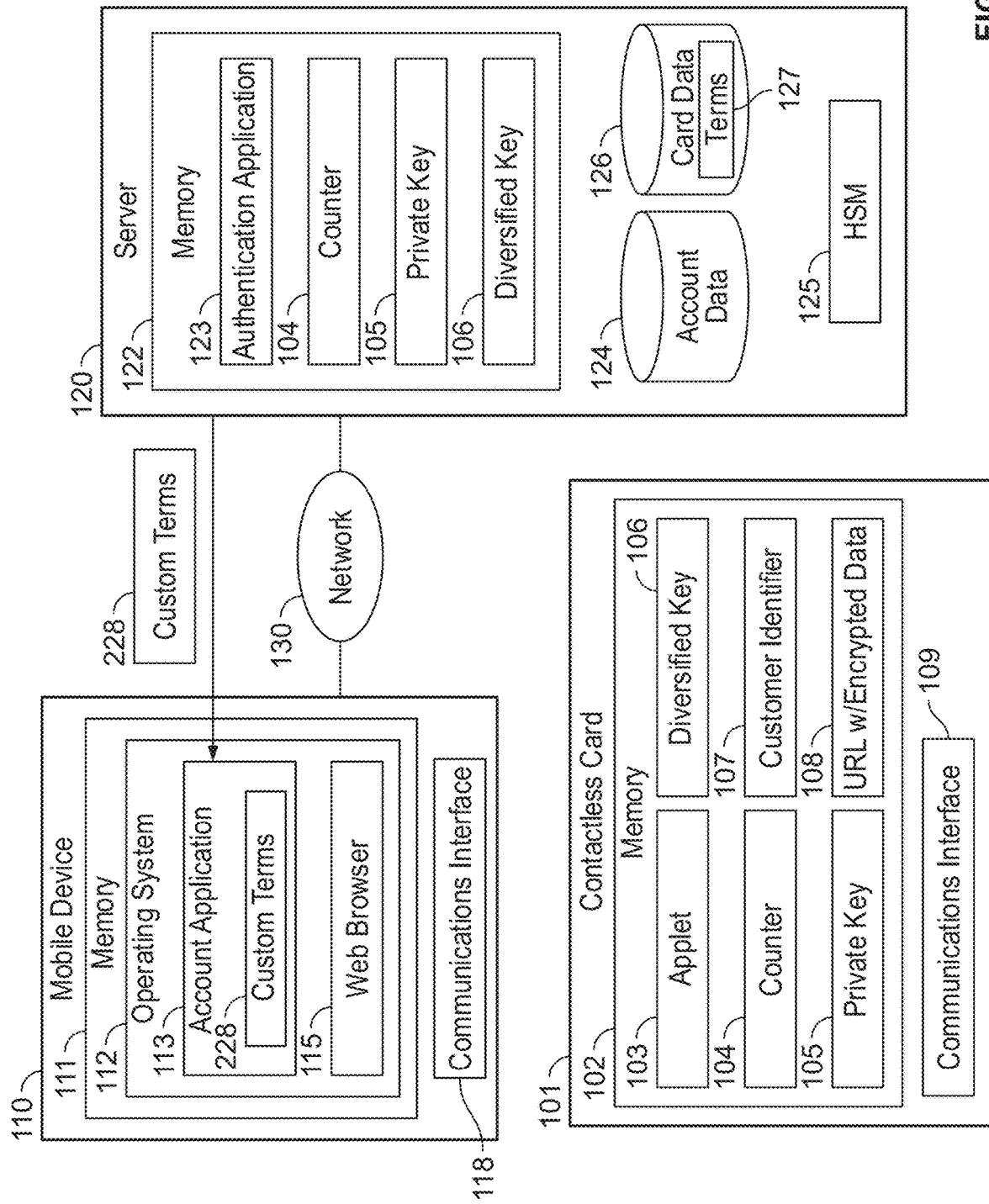

FIG. 2B reflects an embodiment where the authentication application 123 verified the encrypted customer ID included in the encrypted data 208. As stated, the authentication application 123 may determine a type of the card 101, a date of the card 101, or any other attribute of the card 101. The authentication application 123 may further determine one or more attributes of the associated account holder (e.g., name, address, age, etc.). The authentication application 123 may then use the attributes of the card 101 and/or the attributes of the account holder to determine a plurality of custom terms 228 for the contactless card 101. The authentication application 123 may then transmit the custom terms 228 to the account application 113. The account application 113 may then output the custom terms 228 for display on the mobile device 110. As stated, in some embodiments (e.g., where the contactless card 101 is a replacement card), the terms 228 may be a reduced set of terms. In such embodiments, the authentication application 123 and/or the account application 113 may modify the reduced set of terms to improve readability thereof.

Figure 2C:
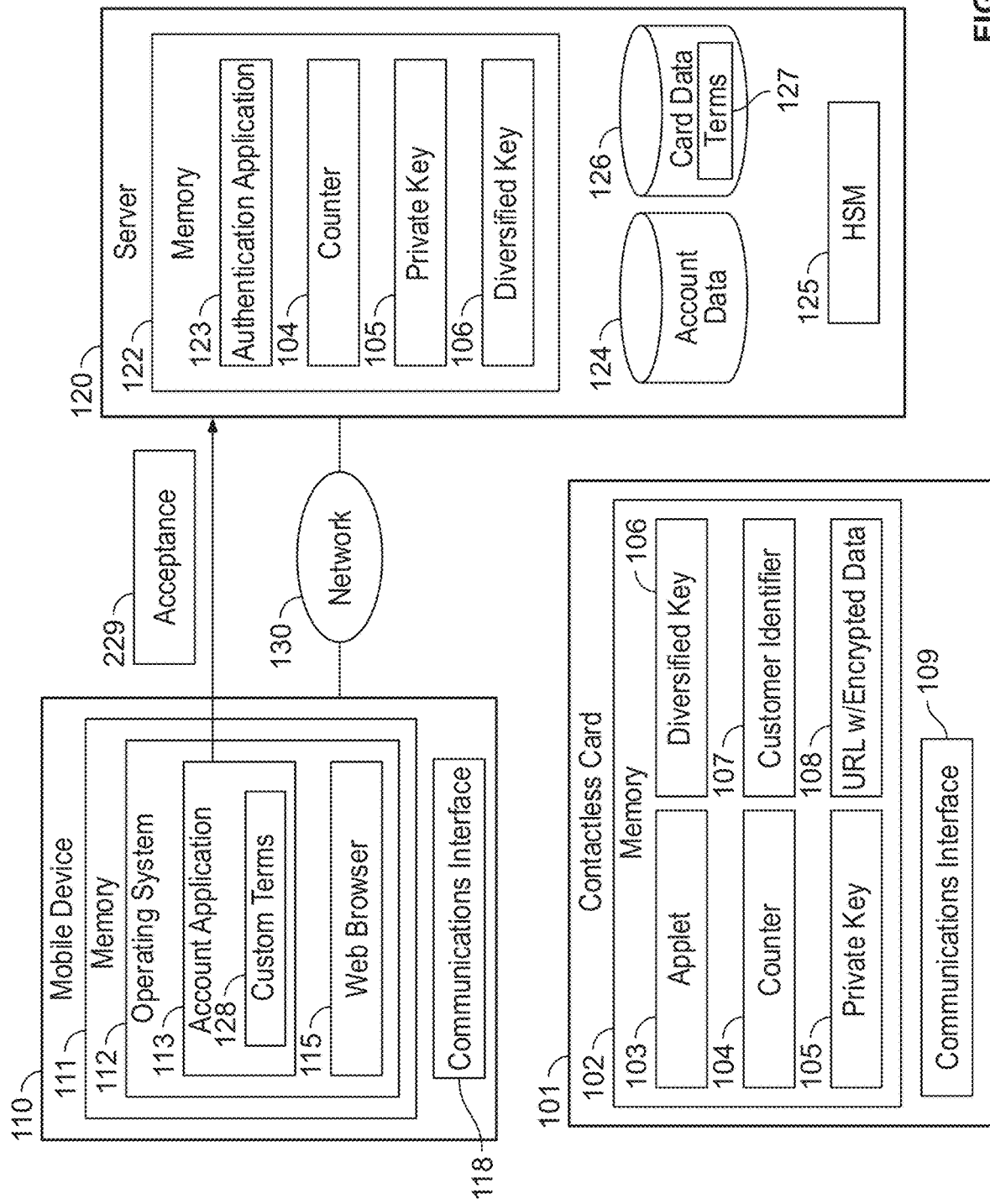

The account application 113 may provide one or more graphical user interface (GUI) elements allowing the user to accept the terms 228. FIG. 2C depicts an embodiment where the user has accepted the terms 228. In the depicted embodiment, the account application 113 transmits an indication of acceptance 229 to the authentication application 123. Once the authentication application 123 receives the acceptance 229, the authentication application 123 may activate the contactless card 101 based on the acceptance of the terms and the verification of the encrypted customer ID 208. For example, the authentication application 123 may store an indication in the account data 124 and/or the card data 126 indicating the contactless card 101 has been activated.

As previously stated, a URL may be directed to the account application 113. Therefore, in such embodiments, the encrypted data 208 generated in FIG. 2A may include a URL directed to a card activation page of the account application 113. In such embodiments, the account application 113 may extract the encrypted customer ID 107 from the URL, optionally decode the encrypted customer ID 107, and transmit the encoded and/or decoded customer ID 107 to the to the server 120 via the network 130. The authentication application 123 may then decrypt the encrypted customer ID 107 to verify the encrypted data.

By requiring validation of encrypted data generated by the contactless card 101 to activate the contactless card 101, embodiments disclosed herein improve the security of the contactless card 101. Furthermore, by presenting terms specific to a type of the contactless card and/or specific to user attributes (e.g. country of residence, state of residence, city of residence, age, legal status, etc.), user privacy and compliance with applicable laws and regulations is improved. Furthermore, doing so removes the need of the card issuer to mail the terms and condition in paper format, thereby conserving resources.

FIG. 3A is a schematic 300 depicting an example embodiment of tapping the contactless card 101 to provide secure activation using custom terms for the contactless card 101. Once the user taps the contactless card 101 to the mobile device 110, the applet 103 of the contactless card 101 encrypts the customer ID 107 to generate the URL with encrypted data 108. The applet 103 may then transmit the URL with encrypted data 108 to the mobile device 110, e.g., via NFC. Once received, the OS 112 may cause the device 110 to access the URL with encrypted data 108. Because no application is in the foreground of the device 110 (e.g., the device displays a home screen of the OS 112), the NFC data transfer may be a background NFC read from the perspective of the device 110. The background NFC read may cause the OS 112 to open an application (e.g. the web browser 115 and/or the account application 113).

In the embodiment depicted in FIG. 3A, the URL with encrypted data 108 may be directed to the server 120 and/or the authentication application 123. As shown in the schematic 310 of FIG. 3B, the OS 112 may launch the web browser 115 and cause the web browser 115 to access the URL with encrypted data 108. As shown, the web browser 115 provides the user with indications specifying that the activation process has been initiated. The authentication application 123 may then attempt to decrypt the encrypted customer ID 107 using the private key 105 and/or the diversified key 106 assigned to the contactless card 101. If the authentication application 123 is unable to decrypt the encrypted customer ID 107 to yield an expected result (e.g., the customer ID 107 of the account, etc.), the authentication application 123 does not verify the encrypted customer ID 107. If the authentication application 123 successfully decrypts the encrypted customer ID 107 to yield an expected result (e.g., the customer ID 107 of the account, etc.), the authentication application 123 verifies the encrypted customer ID 107. As shown in FIG. 3B, the authentication application 123 successfully decrypts the encrypted customer ID, and the authentication application 123 transmits an indication of the verification to the web browser 115. The authentication application 123 may then determine the custom terms for the contactless card 101 based on one or more attributes of the card 101 and/or one or more attributes of the account holder(s).

FIG. 3C is a schematic 320 illustrating a simplified portion of the custom terms 127 determined by the authentication application 123 for the contactless card 101 being activated. More specifically, FIG. 3C depicts an embodiment where the contactless card 101 being activated is a replacement of a previous contactless card 101. Therefore, the web browser 115 may output some terms, such as the terms 321, in a modified format, such as bold and italicized font. Doing so may allow the user to easily view the terms. Furthermore, as shown, the web browser may provide a link 322 to the complete terms specific to the account holder and the card 101. Once accessed, the link 322 may cause the web browser 115 to display all relevant terms. The user may select the accept button to accept the terms, which causes the web browser 115 to transmit an indication of acceptance to the authentication application 123. FIG. 3D is a schematic 330 illustrating an embodiment where the authentication application 123 has activated the card 101 for use, and returns a success page to the web browser 115.

FIG. 4A is a schematic 400 depicting an example embodiment of tapping the contactless card 101 to provide secure activation using custom terms for the contactless card 101. As shown, the account application 113 may be executing on the mobile device 110, and instruct the user to tap the contactless card 101 for activation. Once the user taps the contactless card 101 to the mobile device 110, the applet 103 of the contactless card 101 encrypts the customer ID 107. The applet 103 may then transmit the encrypted customer ID 107 to the mobile device 110, e.g., via NFC.

FIG. 4B is a schematic 410 illustrating an embodiment where the account application 113 receives the encrypted customer ID 107 from the contactless card 101. The account application 113 may then transmit the encrypted customer ID 107 to the authentication application 123 for verification. The authentication application 123 may then attempt to decrypt the encrypted customer ID 107 using the private key 105 and/or the diversified key 106 assigned to the contactless card 101. If the authentication application 123 is unable to decrypt the encrypted customer ID 107 to yield an expected result (e.g., the customer ID 107 of the account, etc.), the authentication application 123 does not verify the encrypted customer ID 107. If the authentication application 123 successfully decrypts the encrypted customer ID 107 to yield an expected result (e.g., the customer ID 107 of the account, etc.), the authentication application 123 verifies the encrypted customer ID 107. As shown in FIG. 4B, the authentication application 123 successfully decrypts the encrypted customer ID, and the authentication application 123 transmits an indication of the verification to the web browser 115. The authentication application 123 may then determine the custom terms for the contactless card 101 based on one or more attributes of the card 101 and/or one or more attributes of the account holder(s).

FIG. 4C is a schematic 420 illustrating a simplified portion of the custom terms 127 determined by the authentication application 123 for the contactless card 101 being activated. More specifically, FIG. 4C depicts an embodiment where the contactless card 101 being activated is not a replacement of a previous contactless card 101. Therefore, the account application 113 may output all terms received from the authentication application 123. While not depicted in FIG. 4C (or FIG. 3C) for the sake of clarity, the complete set of terms may be displayed on the device 110. The user may select the accept button to accept the terms, which causes the account application 113 to transmit an indication of acceptance to the authentication application 123. FIG. 4D is a schematic 430 illustrating an embodiment where the authentication application 123 has activated the card 101 for use, and returns a success page to the account application 113.

Figure 5A:
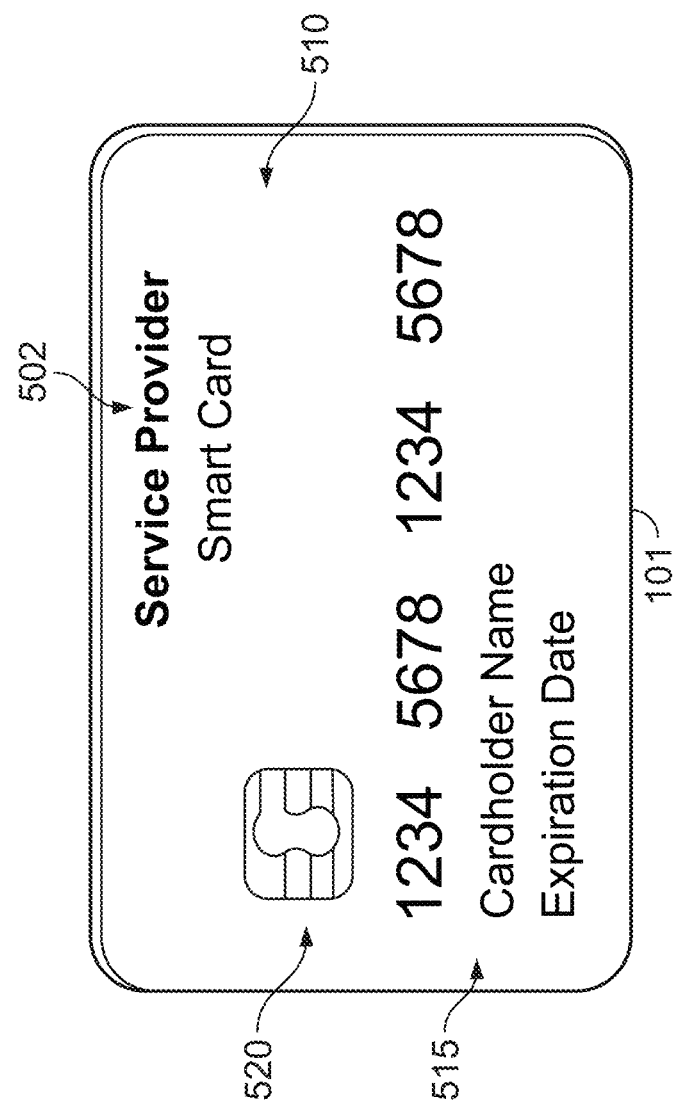
FIGS. 5A-5B illustrate an example contactless card.

FIG. 5A illustrates a contactless card 101, which may comprise a payment card, such as a credit card, debit card, and/or a gift card. As shown, the contactless card 101 may be issued by a service provider 502 displayed on the front or back of the card 101. In some examples, the contactless card 101 is not related to a payment card, and may comprise, without limitation, an identification card. In some examples, the payment card may comprise a dual interface contactless payment card. The contactless card 101 may comprise a substrate 510, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 515 displayed on the front and/or back of the card, and a contact pad 520. The contact pad 520 may be configured to establish contact with another communication device, such as the mobile devices 110, a user device, smart phone, laptop, desktop, or tablet computer. The contactless card 101 may also include processing circuitry, antenna and other components not shown in FIG. 5A. These components may be located behind the contact pad 520 or elsewhere on the substrate 510. The contactless card 101 may also include a magnetic strip or tape, which may be located on the back of the card (not shown in FIG. 5A).

Figure 5B:
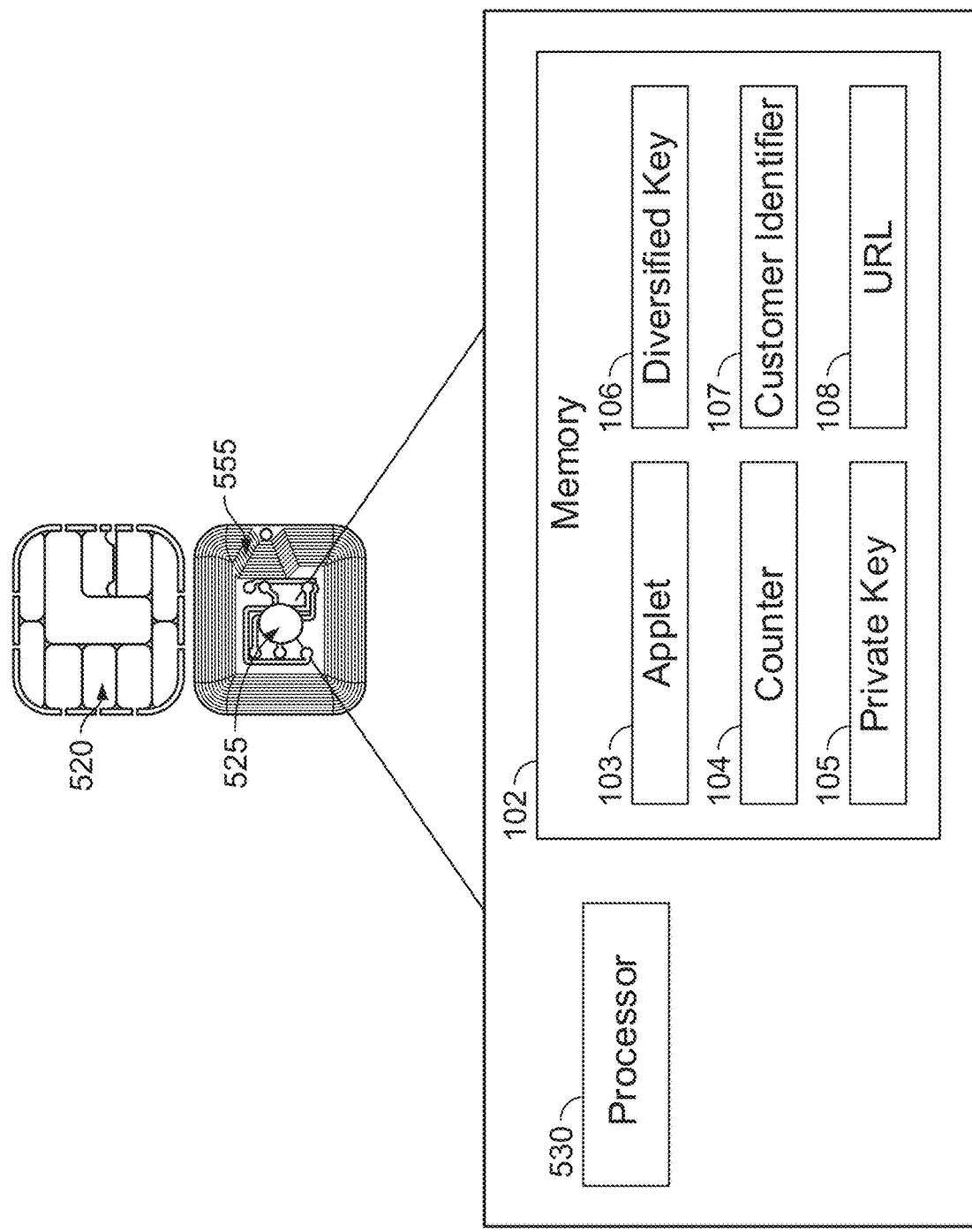

As illustrated in FIG. 5B, the contact pad 520 of contactless card 101 may include processing circuitry 525 for storing and processing information, including a microprocessor 530 and the memory 102. It is understood that the processing circuitry 525 may contain additional components, including processors, memories, error and parity/CRC checkers, data encoders, anti-collision algorithms, controllers, command decoders, security primitives and tamper proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory.

The memory 102 may be configured to store one or more applets 103, the counter value 104, private key 105, the diversified key 106, and one or more customer (or user) IDs 107. The one or more applets 103 may comprise one or more software applications configured to execute on one or more contactless cards, such as a Java® Card applet. However, it is understood that applets 103 are not limited to Java Card applets, and instead may be any software application operable on contactless cards or other devices having limited memory. The customer ID 107 may comprise a unique alphanumeric identifier assigned to a user of the contactless card 101, and the identifier may distinguish the user of the contactless card from other contactless card users. In some examples, the customer ID 107 may identify both a customer and an account assigned to that customer and may further identify the contactless card associated with the customer's account. In some embodiments, the applet 103 may use the customer ID 107 as input to a cryptographic algorithm with the keys 105 and/or 106 to encrypt the customer ID 107. Similarly, the applet 103 may construct a URL that includes the encrypted customer ID 107 as a parameter. The URL may be directed to the server 120 and/or the account application 113.

The processor and memory elements of the foregoing exemplary embodiments are described with reference to the contact pad, but the present disclosure is not limited thereto. It is understood that these elements may be implemented outside of the pad 520 or entirely separate from it, or as further elements in addition to processor 530 and memory 102 elements located within the contact pad 520.

In some examples, the contactless card 101 may comprise one or more antennas 555. The one or more antennas 555 may be placed within the contactless card 101 and around the processing circuitry 525 of the contact pad 520. For example, the one or more antennas 555 may be integral with the processing circuitry 525 and the one or more antennas 555 may be used with an external booster coil. As another example, the one or more antennas 555 may be external to the contact pad 520 and the processing circuitry 525.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 555, processing circuitry 525, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader (e.g., the communications interface 118 of the device 110), and produce an NDEF message that comprises a cryptographically secure OTP (e.g., an encrypted customer ID) encoded as an NDEF text tag.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
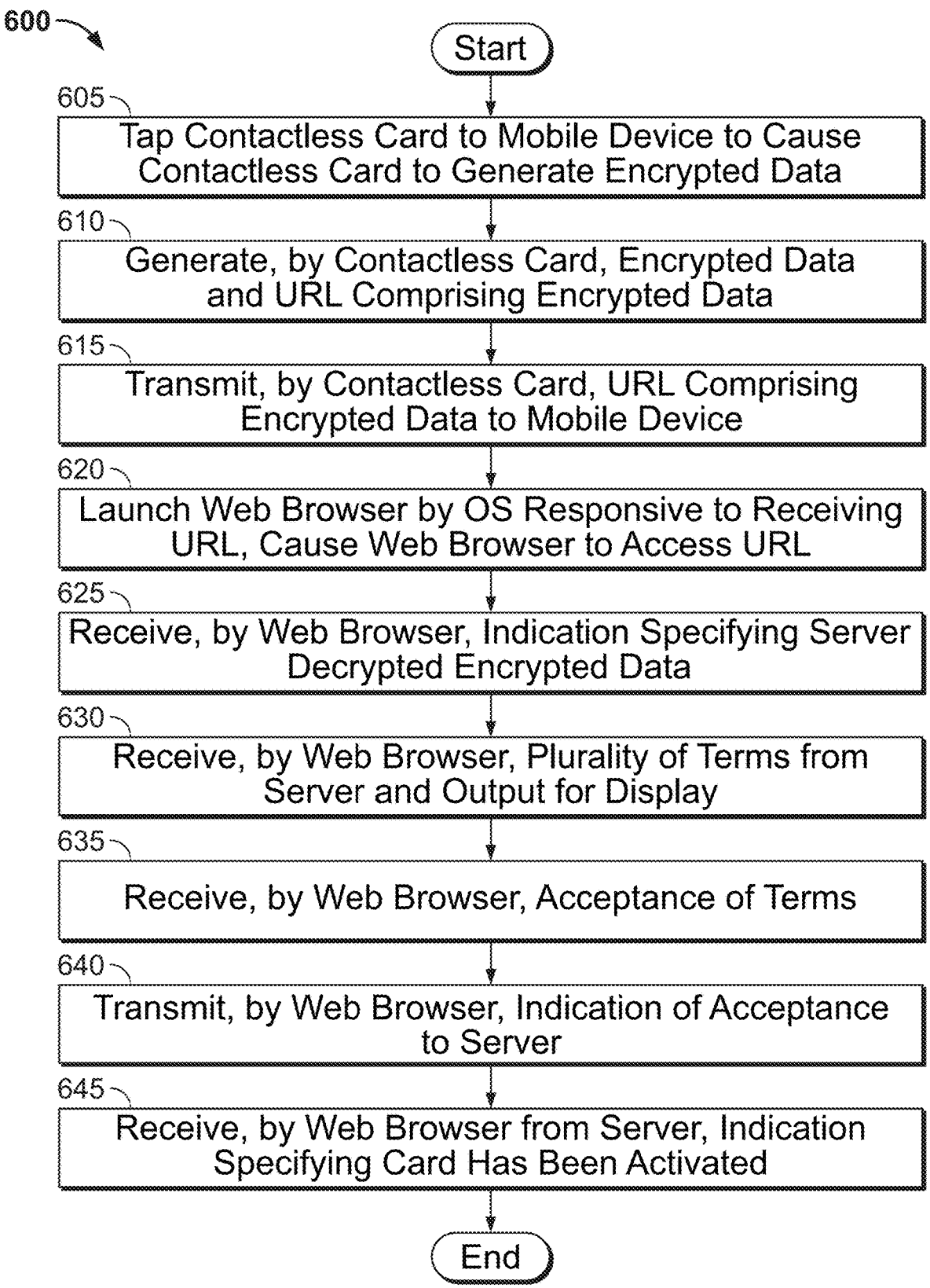
FIG. 6 illustrates an embodiment of a first logic flow.

FIG. 6 illustrates an embodiment of a logic flow 600. The logic flow 600 may be representative of some or all of the operations executed by one or more embodiments described herein. For example, the logic flow 600 may include some or all of the operations to activate a contactless card 101 using terms specific to the contactless card and the account holder. Embodiments are not limited in this context.

As shown, the logic flow 600 begins at block 605, where a user taps the contactless card 101 to the mobile device 110 to cause the applet 103 of the contactless card 101 to generate encrypted data. At block 610, the applet 103 generates the customer ID 107 as part of a URL with encrypted data. At block 615, the applet transmits the URL with encrypted data to the mobile device 110. At block 620, the OS 112 may launch the web browser 115 to access the URL with encrypted data, which may be directed to the server 120 and/or the authentication application 123. The server 120 may attempt to decrypt the encrypted customer ID included in the URL as described herein. At block 625, the web browser 115 receives an indication from the server 120 that the encrypted customer ID 107 was verified by decrypting the encrypted customer ID 107. Doing so may cause the server 120 to determine the terms that are specific to the account holder and the contactless card 101.

At block 630, the web browser 115 receives the plurality of terms from the server 120 and outputs the terms for display. At block 635, the web browser 115 receives acceptance of the terms from the user. At block 640, the web browser 115 transmits an indication of the acceptance to the server 120. Doing so may cause the server 120 to activate the contactless card 101. At block 645, the web browser 115 may receive and output an indication from the server specifying that the contactless card 101 has been activated.

Figure 7:
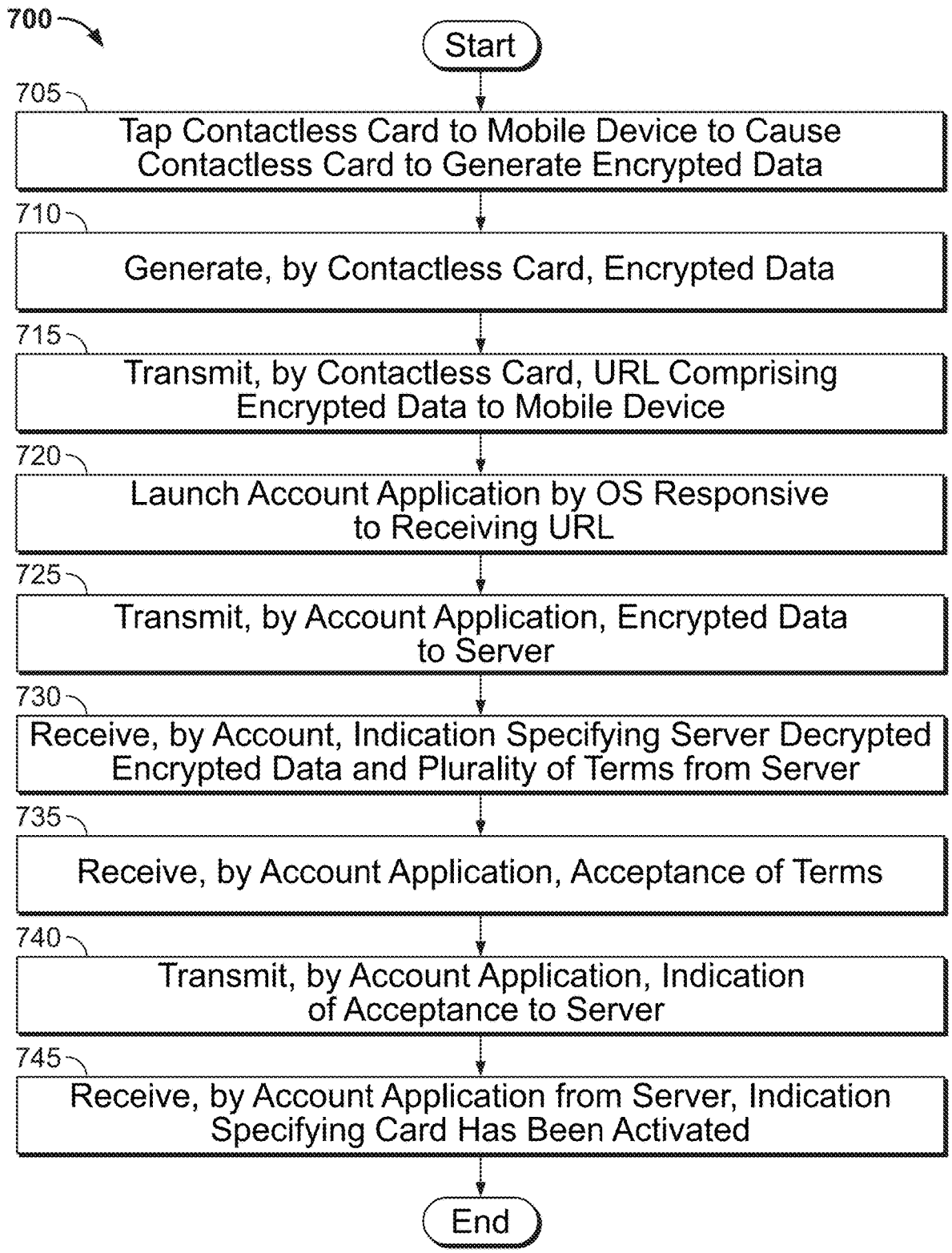
FIG. 7 illustrates an embodiment of a second logic flow.

FIG. 7 illustrates an embodiment of a logic flow 700. The logic flow 700 may be representative of some or all of the operations executed by one or more embodiments described herein. For example, the logic flow 700 may include some or all of the operations to activate a contactless card 101 using terms specific to the contactless card and the account holder. Embodiments are not limited in this context.

As shown, the logic flow 700 begins at block 705, where a user taps the contactless card 101 to the mobile device 110 to cause the applet 103 of the contactless card 101 to generate encrypted data. At block 710, the applet 103 generates the encrypted customer ID 107, which may be part of a URL with encrypted data, where the URL is directed to an activation page of the account application 113. At block 715, the applet transmits the URL with encrypted data to the mobile device 110. At block 720, the OS 112 may launch the account application 113 and open the card activation page responsive to receiving the URL with encrypted data 108. At block 725, the account application 113 transmits the received encrypted data (e.g., the encrypted customer ID 107) to the server 120. In one embodiment, the account application extracts the encrypted data (e.g., the encrypted customer ID 107) from the URL 108 before transmitting the encrypted data to the server. In another embodiment, the account application 113 transmits the URL with encrypted data 108 to the server 120. The server 120 may then attempt to decrypt the encrypted data as described herein. Doing so may cause the server 120 to determine the terms that are specific to the account holder and the contactless card 101.

At block 730, the account application 113 receives an indication from the server 120 that the encrypted customer ID 107 was verified by decrypting the encrypted customer ID 107 and the determined plurality of terms. At block 735, the account application 113 receives acceptance of the terms from the user. At block 740, the account application 113 transmits an indication of the acceptance to the server 120. Doing so may cause the server 120 to activate the contactless card 101. At block 745, the account application 113 may receive and output an indication from the server specifying that the contactless card 101 has been activated.

Figure 8:
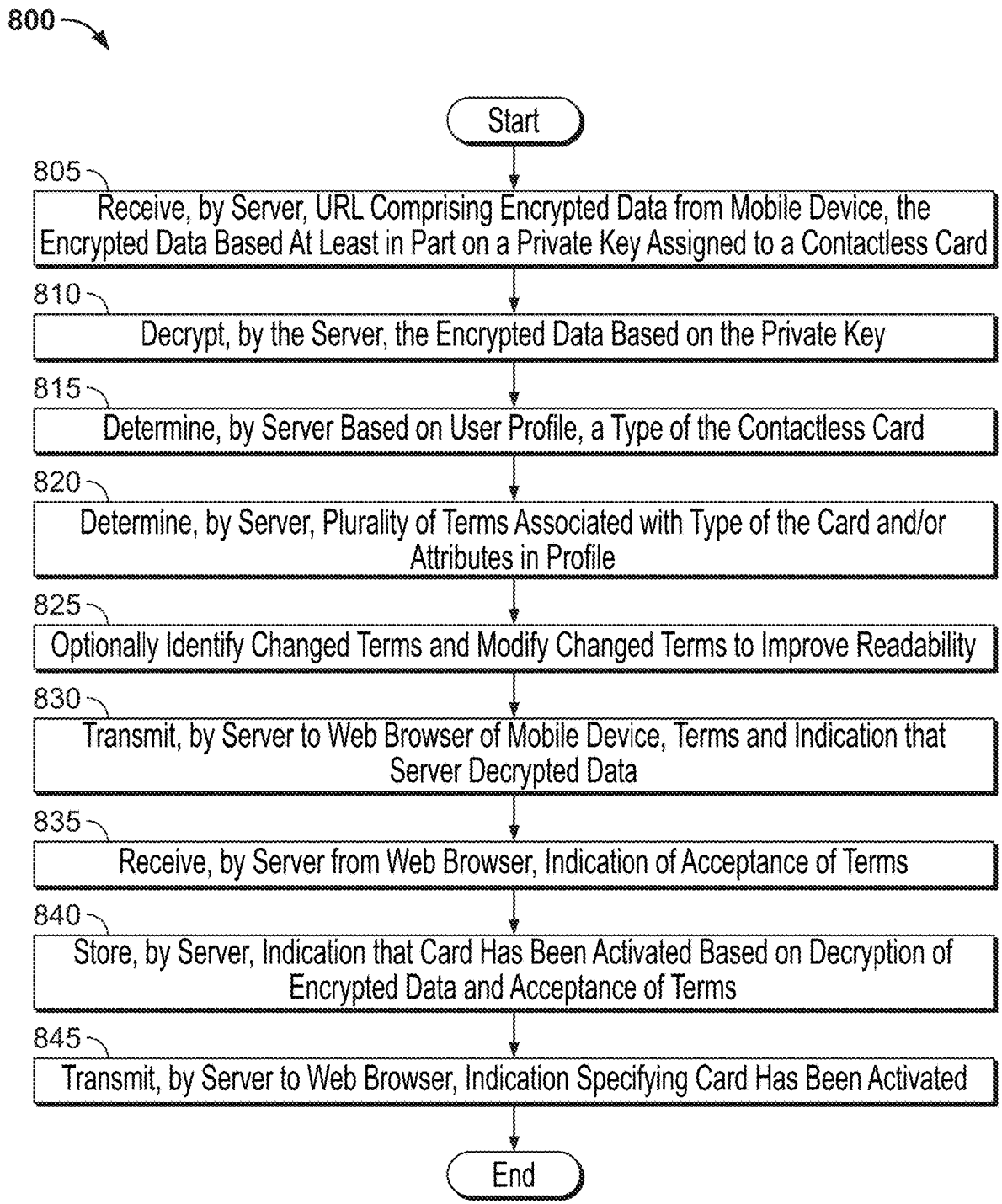
FIG. 8 illustrates an embodiment of a third logic flow.

FIG. 8 illustrates an embodiment of a logic flow 800. The logic flow 800 may be representative of some or all of the operations executed by one or more embodiments described herein. For example, the logic flow 800 may include some or all of the operations to activate a contactless card 101 using terms specific to the contactless card and the account holder. Embodiments are not limited in this context.

As shown, the logic flow 800 begins at block 805, where the server 120 receives a URL comprising encrypted data from a web browser 115 executing on a mobile device 110. The URL with encrypted data may be generated by the applet 103 of the contactless card 101 based at least in part on the private key assigned to the contactless card 101. At block 810, the server 120 may decrypt the encrypted data based on an instance of the private key maintained by the server 120. At block 815, the server 120 determines a type of the contactless card 101. For example, a unique identifier of the contactless card 101 may be stored in the account data 124 and/or the card data 126. The unique identifier may be used to determine a type of the card, e.g., in the card data 126. The card data 126 may specify the type of the card, a date the card was issued, and any related terms 127 for the card. At block 820, the server 120 determines the plurality of terms for the card and/or terms based on user attributes, such as age, residence, credit limits, etc.

At block 825, the server 120 may optionally identify any changed terms for the card, e.g., when the card is a replacement for a previous card held by the account holder. The server 120 may modify the changed terms (e.g., highlight, bold, increase font size, etc.) of the changed terms to improve readability on the user's device. At block 830, the server 120 transmits an indication to the web browser 115 that the server 120 decrypted the encrypted data, thereby verifying the encrypted data. The server 120 may further transmit the terms determined at block 820, which may be outputted for display by the web browser 115. At block 835, the server 120 receives an indication from the web browser 115 specifying that the user accepted the terms. At block 840, the server 120 stores an indication (e.g., in the account data 124) indicating that the card has been activated for use based on the acceptance of the terms and the decryption of the encrypted data. At block 845, the server 120 transmits an indication to the web browser 115 indicating the card has been activated. The web browser 115 may display the indication on a display.

Figure 9:
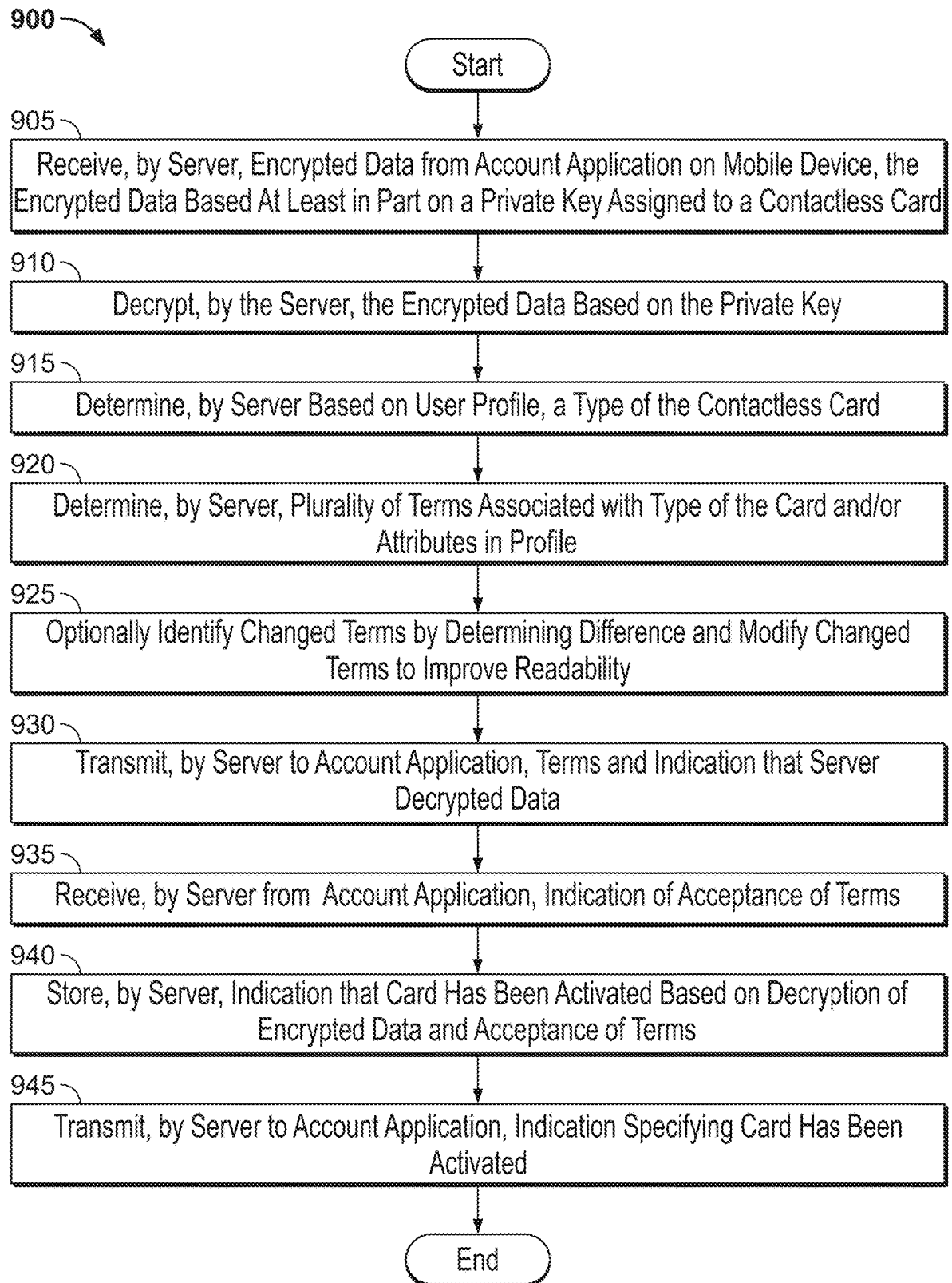
FIG. 9 illustrates an embodiment of a fourth logic flow.

FIG. 9 illustrates an embodiment of a logic flow 900. The logic flow 900 may be representative of some or all of the operations executed by one or more embodiments described herein. For example, the logic flow 900 may include some or all of the operations to activate a contactless card 101 using terms specific to the contactless card and the account holder. Embodiments are not limited in this context.

As shown, the logic flow 900 begins at block 905, where the server 120 receives encrypted data from an account application 113 executing on a mobile device 110. The encrypted data may be generated by the applet 103 of the contactless card 101 based at least in part on the private key assigned to the contactless card 101. In some embodiments, the applet 103 includes the encrypted data as a parameter of a URL with encrypted data. At block 910, the server 120 may decrypt the encrypted data based on an instance of the private key maintained by the server 120. At block 915, the server 120 determines a type of the contactless card 101. For example, a unique identifier of the contactless card 101 may be stored in the account data 124 and/or the card data 126. The unique identifier may be used to determine a type of the card, e.g., in the card data 126. The card data 126 may specify the type of the card, a date the card was issued, and any related terms 127 for the card. At block 920, the server 120 determines the plurality of terms for the card and/or terms based on user attributes, such as age, residence, credit limits, etc.

At block 925, the server 120 may optionally identify any changed terms for the card, e.g., when the card is a replacement for a previous card held by the account holder. The server 120 may modify the changed terms (e.g., highlight, bold, increase font size, etc.) of the changed terms to improve readability on the user's device. At block 930, the server 120 transmits an indication to the account application 113 that the server 120 decrypted the encrypted data, thereby verifying the encrypted data. The server 120 may further transmit the terms determined at block 920, which may be outputted for display by the account application 113. At block 935, the server 120 receives an indication from the account application 113 specifying that the user accepted the terms. At block 940, the server 120 stores an indication (e.g., in the account data 124) indicating that the card has been activated for use based on the acceptance of the terms and the decryption of the encrypted data. At block 945, the server 120 transmits an indication to the account application 113 indicating the card has been activated. The account application 113 may display the indication on a display.

Figure 10:
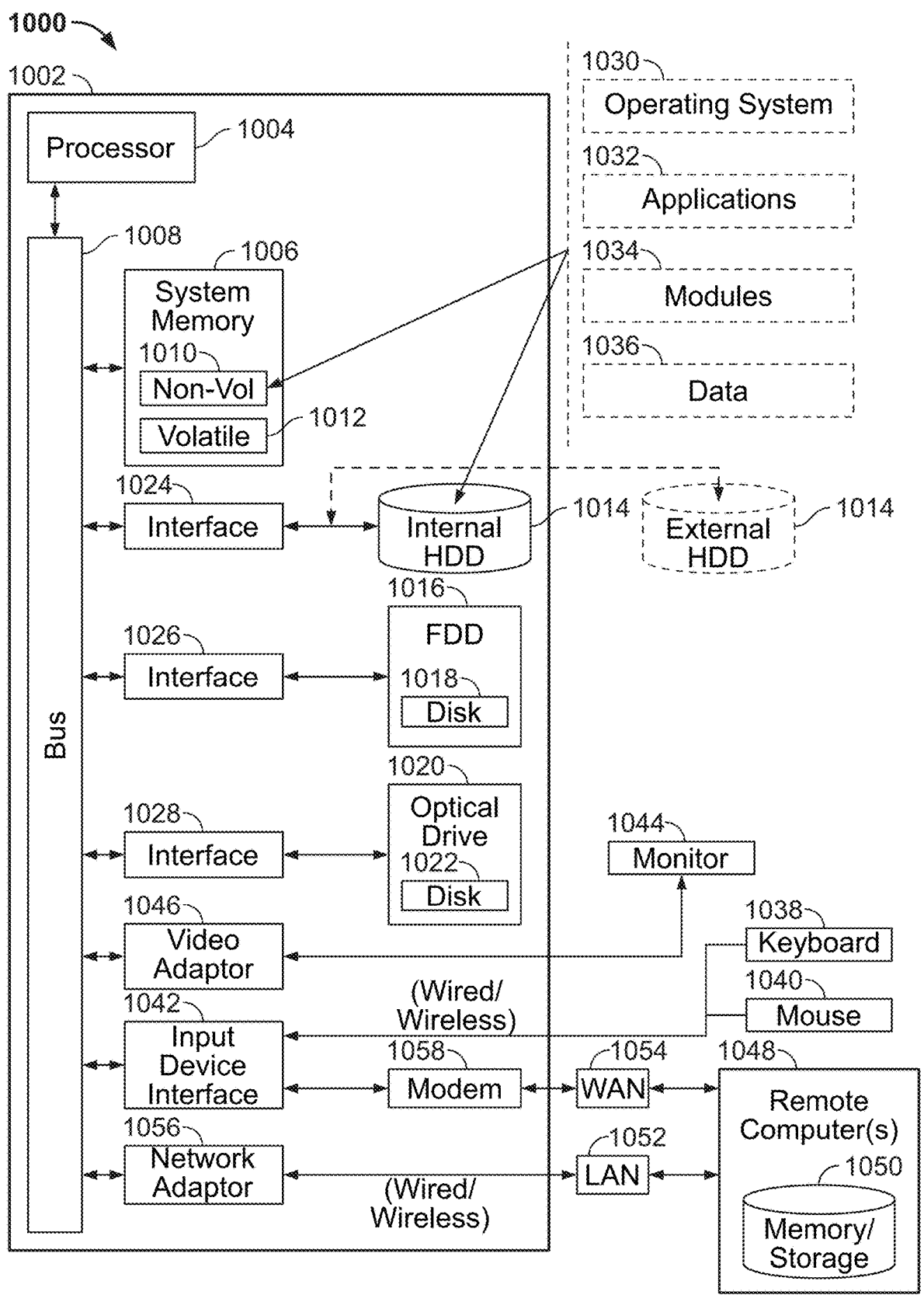
FIG. 10 illustrates an embodiment of a computing system.

FIG. 10 illustrates an embodiment of an exemplary computing architecture 1000 comprising a computing system 1002 that may be suitable for implementing various embodiments as previously described. In various embodiments, the computing architecture 1000 may comprise or be implemented as part of an electronic device. In some embodiments, the computing architecture 1000 may be representative, for example, of a system that implements one or more components of the system 100. In some embodiments, computing system 1002 may be representative, for example, of the contactless card 101, mobile devices 110, and authentication server 120 of the system 100. The embodiments are not limited in this context. More generally, the computing architecture 1000 is configured to implement all logic, applications, systems, methods, apparatuses, and functionality described herein with reference to FIGS. 1-9.

As used in this application, the terms "system" and "component" and "module" are intended to refer to a computer-related entity, either hardware, a combination of hardware and software, software, or software in execution, examples of which are provided by the exemplary computing architecture 1000. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 1002 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 1002.

As shown in FIG. 10, the computing system 1002 comprises a processor 1004, a system memory 1006 and a system bus 1008. The processor 1004 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 1004.

The system bus 1008 provides an interface for system components including, but not limited to, the system memory 1006 to the processor 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computing system 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies. The computing system 1002 is generally is configured to implement all logic, systems, methods, apparatuses, and functionality described herein with reference to FIGS. 1-9.

The drives and associated computer-readable media provide volatile and/or nonvolatile storage of data, data structures, computer-readable instructions, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the system 100, e.g., the applet 103, counter 104, private key 105, diversified key 106, customer ID 107, operating system 112, account application 113, web browser 115, the authentication application 123, the account data 124, the card data 126, terms 127, URL with encrypted data 108, and/or the encrypted data 208.

A user can enter commands and information into the computing system 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computing system 1002. In addition to the monitor 1044, a computer typically includes other peripheral output devices, such as speakers, printers, and so forth.

The computing system 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computing system 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 1052 and the WAN 1054.

When used in a LAN networking environment, the computing system 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computing system 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computing system 1002, or portions thereof, can be stored in the remote memory/storage device 1050. It will be appreciated that the network connections shown are exemplary and other means of establishing a communications link between the computers can be used.

The computing system 1002 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:
receiving, by a server from a device, a request to activate a contactless card, the request comprising encrypted authentication data generated by the contactless card;
decrypting, by the server, the encrypted authentication data;
determining, by the server based on a profile associated with the contactless card, that the contactless card is a first type of contactless card of a plurality of types of contactless cards;
determining, by the server, a plurality of terms associated with the first type of the contactless card;
transmitting, by the server, the plurality of terms to the device;
receiving, by the server from the device, an indication specifying acceptance of the plurality of terms; and
storing, by the server based on the decryption of the encrypted authentication data and the received indication specifying acceptance of the plurality of terms, an indication in a database specifying the contactless card is activated for use;
wherein the encrypted authentication data is a parameter of a link, wherein the encrypted authentication data is distinct from payment data generated by the contactless card.

2. The method of claim 1, further comprising:
extracting, by the server, the encrypted authentication data from the link; and
decoding, by the server, the extracted encrypted authentication data prior to the decryption.

3. The method of claim 1, further comprising:
determining the contactless card is the first type of contactless card based on a unique identifier assigned to the contactless card.

4. The method of claim 1, further comprising:
transmitting, by the server, an indication to the device specifying that the contactless card is activated for use.

5. The method of claim 1, further comprising:
receiving, by the server, a plurality of attributes from the profile associated with the contactless card, the plurality of attributes comprising at least the first type of the contactless card and an address associated with the contactless card; and determining, by the server, the plurality of terms based on the first type of the contactless card and the address associated with the contactless card, wherein at least one term of the plurality of terms is based on the address.

6. The method of claim 1, wherein a subset of the plurality of terms are formatted according to a modified format, wherein the modified format comprises one or more of a highlight effect, a bold effect, or an italics effect applied to the subset of the plurality of terms and not applied to the remaining plurality of terms.

7. The method of claim 1, wherein at least one term of the plurality of terms is based on an address specified in the profile.

8. A non-transitory computer-readable storage medium, the computer-readable storage medium including instructions that when executed by a processor, cause the processor to:
receive, from a device, a request to activate a contactless card, the request comprising encrypted authentication data generated by the contactless card;
decrypt the encrypted authentication data;
determine, based on a profile associated with the contactless card, that the contactless card is a first type of contactless card of a plurality of types of contactless cards;
determine a plurality of terms associated with the first type of the contactless card;
transmit the plurality of terms to the device;
receive, from the device, an indication specifying acceptance of the plurality of terms; and
store, based on the decryption of the encrypted authentication data and the received indication specifying acceptance of the plurality of terms, an indication in a database specifying the contactless card is activated for use;
wherein the encrypted authentication data is a parameter of a link, wherein the encrypted authentication data is distinct from payment data generated by the contactless card.

9. The computer-readable storage medium of claim 8, wherein the instructions further cause the processor to:
extract the encrypted authentication data from the link; and
decode the extracted encrypted authentication data prior to the decryption.

10. The computer-readable storage medium of claim 8, wherein the instructions further cause the processor to:
determine the first type of the contactless card based on a unique identifier assigned to the contactless card.

11. The computer-readable storage medium of claim 8, wherein the instructions further cause the processor to:
transmit an indication to the device specifying that the contactless card is activated for use.

12. The computer-readable storage medium of claim 8, wherein the instructions further cause the processor to:
receive a plurality of attributes from the profile associated with the contactless card, the plurality of attributes comprising at least the first type of the contactless card and an address associated with the contactless card; and
determine the plurality of terms based on the first type of the contactless card and the address associated with the contactless card, wherein at least one term of the plurality of terms is based on the address.

13. The computer-readable storage medium of claim 8, wherein a subset of the plurality of terms are formatted according to a modified format, wherein the modified format comprises one or more of a highlight effect, a bold effect, or an italics effect applied to the subset of the plurality of terms and not applied to the remaining plurality of terms.

14. A computing apparatus comprising:
a processor; and
a memory storing instructions that, when executed by the processor, cause the processor to:
receive, from a device, a request to activate a contactless card, the request comprising encrypted authentication data generated by the contactless card;
decrypt the encrypted authentication data;
determine, based on a profile associated with the contactless card, that the contactless card is a first type of contactless card of a plurality of types of contactless cards;
determine a plurality of terms associated with the first type of the contactless card;
transmit the plurality of terms to the device;
receive, from the device, an indication specifying acceptance of the plurality of terms; and
store, based on the decryption of the encrypted authentication data and the received indication specifying acceptance of the plurality of terms, an indication in a database specifying the contactless card is activated for use;
wherein the encrypted authentication data is a parameter of a link, wherein the encrypted authentication data is distinct from payment data generated by the contactless card.

15. The computing apparatus of claim 14, wherein the instructions further cause the processor to:
extract the encrypted authentication data from the link; and
decode the extracted encrypted authentication data prior to the decryption.

16. The computing apparatus of claim 14, wherein the instructions further cause the processor to:
determine the first type of the contactless card based on a unique identifier assigned to the contactless card.

17. The computing apparatus of claim 14, wherein the instructions further cause the processor to:
transmit an indication to the device specifying that the contactless card is activated for use.

* * * * *